(12) United States Patent
Nakata et al.

(10) Patent No.: US 8,303,046 B2
(45) Date of Patent: Nov. 6, 2012

(54) BRAKE APPARATUS, BRAKE CONTROL UNIT, AND BRAKE CONTROL METHOD

(75) Inventors: Daisuke Nakata, Toyota (JP); Takahiro Okano, Toyota (JP); Tsukasa Fukasawa, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 325 days.

(21) Appl. No.: 12/673,073

(22) PCT Filed: Aug. 8, 2008

(86) PCT No.: PCT/IB2008/002092
§ 371 (c)(1),
(2), (4) Date: Feb. 11, 2010

(87) PCT Pub. No.: WO2009/022211
PCT Pub. Date: Feb. 19, 2009

(65) Prior Publication Data
US 2011/0285198 A1    Nov. 24, 2011

(30) Foreign Application Priority Data
Aug. 10, 2007 (JP) ................. 2007-210509

(51) Int. Cl.
*B60T 13/74* (2006.01)
*G06F 19/00* (2006.01)
(52) U.S. Cl. ...... 303/3; 303/119.2; 303/122.1; 303/151; 303/152; 701/70; 701/79; 188/1.11 E; 188/158
(58) Field of Classification Search ............... 303/3, 20, 303/113.1, 113.2, 113.3, 113.5, 10, 151, 303/152, 119.2, 122.1; 701/70, 79; 188/106 F, 188/158, 1.11 E
See application file for complete search history.

(56) References Cited

U.S. PATENT DOCUMENTS

| | | | | |
|---|---|---|---|---|
| 5,882,093 A | * | 3/1999 | Enomoto et al. | 303/152 |
| 5,984,432 A | * | 11/1999 | Otomo et al. | 303/119.2 |
| 6,164,734 A | * | 12/2000 | Otomo et al. | 303/122.1 |
| 2001/0004723 A1 | * | 6/2001 | Nishiyama | 701/79 |
| 2007/0126382 A1 | * | 6/2007 | Kang et al. | 318/376 |
| 2008/0228367 A1 | * | 9/2008 | Aoki et al. | 701/70 |

FOREIGN PATENT DOCUMENTS

| | | |
|---|---|---|
| DE | 10 2004 027 256 A1 | 1/2005 |
| EP | 0 864 477 A2 | 9/1998 |
| EP | 0 864 477 A3 | 9/1998 |
| EP | 1 110 832 A2 | 6/2001 |
| EP | 1 110 832 A3 | 6/2001 |
| JP | 2000-71958 | 3/2000 |

(Continued)

*Primary Examiner* — Robert A Siconolfi
*Assistant Examiner* — San Aung
(74) *Attorney, Agent, or Firm* — Oblon, Spivak, McClelland, Maier & Neustadt, L.L.P.

(57) ABSTRACT

There is provide a brake control technology according to which a target hydraulic pressure is reliably achieved when a hydraulic pressure is decreased during hydraulic control and brake drag does not occur even when the target hydraulic pressure is zero. In a brake apparatus, a dead-band region is set for the target hydraulic pressure that is used in the hydraulic control. When braking control is switched from the hydraulic control to regenerative control in cooperative braking control, residual pressure reduction control is executed. In the residual pressure reduction control, the target hydraulic pressure is set to a value that is lower than zero to which the hydraulic pressure should be brought.

13 Claims, 9 Drawing Sheets

FOREIGN PATENT DOCUMENTS

| | | |
|---|---|---|
| JP | 2001-233191 | 8/2001 |
| JP | 2001-260832 | 9/2001 |
| JP | 2006-123889 | 5/2006 |
| JP | 2006-137382 | 6/2006 |
| JP | 2006-232117 | 9/2006 |
| JP | 2006-312384 | 11/2006 |
| WO | WO 2007/073074 A1 | 6/2007 |

* cited by examiner

BRAKE APPARATUS, BRAKE CONTROL UNIT, AND BRAKE CONTROL METHOD

INCORPORATION BY REFERENCE

The disclosure of Japanese Patent Application No. 2007-210509 filed on Aug. 10, 2007 including the specification, drawings and abstract is incorporated herein by reference in its entirety.

BACKGROUND OF THE INVENTION

1. Field of the Invention

The invention relates to brake control for controlling braking forces that are applied to wheels of a vehicle.

2. Description of the Related Art

For example, Japanese Patent Application Publication No. 2006-123889 (JP-A-2006-123889) describes a brake apparatus that achieves a target braking torque, which is determined based on an operation state and a traveling state of a vehicle, by performing regenerative braking control and hydraulic braking control in combination. Cooperative braking control is executed so that a total braking torque, which is a total sum of a regenerative braking torque and a hydraulic braking torque, matches a required braking torque that is a torque required by a driver. With this brake apparatus, it is possible to collect regenerative energy by executing regenerative braking control, thereby enhancing the fuel efficiency of the vehicle.

At the early stage of the cooperative braking control, a hydraulic pressure that should be achieved by the hydraulic braking control is temporarily raised by a large amount upon issuance of a command to execute the regenerative braking control. There is a time lag between when the command is issued and when a required regenerative braking force is actually achieved. Therefore, the hydraulic pressure is temporarily raised by a large amount in order to reliably obtain a required braking force during a period until the required regenerative braking force becomes available. After a sufficient hydraulic braking force is obtained, the hydraulic braking force is gradually decreased to gradually switch the braking control from the hydraulic braking control to the regenerative braking control.

However, in the hydraulic braking control, a predetermined-width dead-band region is usually set for a target hydraulic pressure in order to suppress occurrence of hunting in a hydraulic pressure. Therefore, even if the target hydraulic pressure is set to zero to switch the braking control from the hydraulic braking control to the regenerative braking control, it is determined that the target hydraulic pressure is achieved if an actual hydraulic pressure (i.e., wheel cylinder pressure) enters the dead-band region. This raises a possibility that the wheel cylinder pressure will not match zero and brake drag occurs. Such a problem may occur not only when the cooperative braking control is executed but also when pressure-decreasing control is executed, for example, when the target hydraulic pressure is set to zero.

SUMMARY OF THE INVENTION

The invention provides a brake control technology according to which a target hydraulic pressure is reliably achieved when a hydraulic pressure is decreased during hydraulic control and brake drag does not occur even when the target hydraulic pressure is zero.

A first aspect of the invention relates to a brake apparatus including: a regenerative brake unit that generates a regenerative braking force by executing regenerative control over an electric motor; a hydraulic brake unit that generates a hydraulic braking force by executing hydraulic control over a hydraulic fluid; and a control unit that controls the regenerative brake unit and the hydraulic brake unit in such a manner that a required braking force, which is calculated based on a brake operation performed by a driver, is achieved. The control unit sets a dead-band region for a target hydraulic pressure that is used in the hydraulic control, and controls a hydraulic pressure of the hydraulic fluid using the dead-band region. When a predetermined residual pressure reduction condition for bringing an actual hydraulic pressure to the target hydraulic pressure is satisfied while the hydraulic pressure is decreased, the control unit executes residual pressure reduction control in which the target hydraulic pressure is set to a value that is lower than an original value to which the hydraulic pressure needs to be brought and the set target hydraulic pressure that is lower than the original value is maintained during a predetermined period.

The "dead-band region" means a region having a predetermined width, which is set for the target hydraulic pressure (the predetermined width is referred to as "dead-band width"). When the hydraulic pressure is controlled in a feedback manner, if the actual hydraulic pressure enters the dead-band region, it is determined that the target hydraulic pressure is substantially achieved. When the dead-band region is set for the target hydraulic pressure, occurrence of hunting in the hydraulic control is suppressed more reliably than when the target hydraulic pressure is set without a dead-band region. The "residual pressure reduction condition" may be set to a determination condition that is used to determine whether timing, at which the hydraulic pressure should be reliably brought to the target hydraulic pressure, has been reached. For example, the determination condition may be set to a condition that timing, at which the braking control should be switched from the hydraulic control to the regenerative control in the cooperative braking control in which the hydraulic control and the regenerative control are executed in a coordinated manner, has been reached, or a condition that the switching condition for switching the braking control from the hydraulic control to the regenerative control is satisfied. The "predetermined period" is empirically determined in advance as the time that is long enough to reliably bring the actual hydraulic pressure to the target hydraulic pressure if the residual pressure reduction control is executed.

According to the first aspect of the invention, when the residual pressure reduction condition is satisfied, the target hydraulic pressure is temporarily set to a value that is lower than an original value to which the hydraulic pressure needs to be brought in the hydraulic control. For convenience of explanation, the target hydraulic pressure to which the hydraulic pressure should be brought is referred to as "actual target hydraulic pressure", and the target hydraulic pressure that is lower than the actual target hydraulic pressure and that is temporarily set is referred to as "tentative target hydraulic pressure". In the regular hydraulic control, the target hydraulic pressure is set to the actual target hydraulic pressure. During the residual pressure reduction control, the target hydraulic pressure is set to the tentative target hydraulic pressure. As a result, during the residual pressure reduction control, the upper limit and the lower limit of the dead-band region are changed to lower values in accordance with a change in the target hydraulic pressure. Therefore, the actual hydraulic pressure is decreased despite the presence of the dead-band region. In the regular hydraulic control, it is difficult to decrease the actual hydraulic pressure to the actual target hydraulic pressure due to the presence of the dead-band region. However, during the residual pressure reduction control, the upper limit and the lower limit of the dead-band region are lowered. Therefore, it is possible to bring the actual hydraulic pressure to the actual target hydraulic pressure. When the target hydraulic pressure is zero, for example, when the cooperative braking control is executed, it is possible to reliably bring the actual hydraulic pressure within the wheel cylinder to zero. As a result, it is possible to suppress occurrence of brake drag.

In this case, if the target hydraulic pressure that is used in the residual pressure reduction control is lower than the actual target hydraulic pressure by an amount corresponding to the dead-band width of the dead-band region, it is possible to reliably bring the actual hydraulic pressure to the hydraulic pressure that should be achieved.

Execution of the residual pressure reduction control may be prohibited unless the regenerative control is being executed. Thus, it is possible to suppress an increase in the frequency, at which actuators (e.g. a control valve) are operated to execute the pressure reduction control, thereby prolonging the useful lives of these actuators.

The brake apparatus may include a state detection unit that detects a control state of a vehicle. The control unit may determine whether there is a possibility that the hydraulic pressure is increased in the hydraulic control based on information detected by the state detection unit. When a predetermined pressure-increase determination condition, under which there is a possibility that the hydraulic pressure is increased, is satisfied, the control unit may restrict execution of the residual pressure reduction control. With this configuration, when it is expected that pressure-increase control is subsequently executed, execution of the residual pressure reduction control is restricted. Therefore, it is possible to maintain appropriate response of the hydraulic pressure to the pressure-increase control.

In the cooperative braking control, when the vehicle speed decreases and falls below a predetermined changeover vehicle speed, changeover control for changing the braking control from the regenerative control to the hydraulic control is executed. The hydraulic pressure will be increased by the hydraulic control. Therefore, when the changeover control is executed, it is preferable not to execute the residual pressure reduction control in order to maintain appropriate response of the hydraulic pressure to the hydraulic control.

The state detection unit may include a vehicle speed detection unit that detects a vehicle speed. The control unit may set, in advance, a residual pressure reduction prohibition vehicle speed, at which the residual pressure reduction control is prohibited, to prevent a decrease in the hydraulic pressure during the changeover control. The control unit may determine that the pressure-increase determination condition is satisfied when the vehicle speed falls below the residual pressure reduction prohibition vehicle speed. The "residual pressure reduction prohibition vehicle speed" may be set to a value equal to the changeover vehicle speed. However, in order to maintain appropriate control feel, it is preferable to set the "residual pressure reduction prohibition vehicle speed" to a value that is higher than the changeover vehicle speed by a predetermined amount to prohibit the reduction of residual pressure before the vehicle speed decreases to the changeover vehicle speed.

The control unit may restrict execution of the residual pressure reduction control when a deviation of an actual torque that is actually achieved from a required regeneration torque, which is a target value used in the regenerative control, is larger than a predetermined permissible deviation. The "required regeneration torque" means a braking torque that should be achieved by the regenerative control. The "actual torque" means a braking torque that is actually achieved by the regenerative braking control. The "permissible deviation" may be set with consideration given to the minimum unit of the torque that is calculated in each of the regenerative control and the hydraulic control. With this configuration, when the deviation of the actual torque from the required regeneration torque that should be achieved by the regenerative control is larger than the permissible deviation, execution of the residual pressure reduction control is restricted.

That is, as can be seen from setting of the changeover vehicle speed, not the regenerative control but the hydraulic control is executed when the vehicle speed is in a low speed region. When the vehicle speed is in the low speed region, a creep torque that is used as drive power may be generated by the electric motor. A braking force that counters the creep torque cannot be generated by the regenerative brake unit if the regenerative brake unit generates a regenerative braking force. This is one of the reasons why the hydraulic control is executed when the vehicle speed is in the low speed region. Therefore, relatively fine-grained braking force control that is executed when the vehicle speed is within the low speed region may be covered by the hydraulic control. In general, the minimum unit of the controllable torque is smaller in the hydraulic control than in the regenerative control. In other words, a coarser calculation is performed on the braking torque in the regenerative control than in the hydraulic control. Therefore, when the deviation of the actual torque from the required regeneration torque is equal to or smaller than the predetermined value, the possibility that the braking torque which should be generated by the hydraulic control becomes substantially zero is increased. That is, because the possibility that the target hydraulic pressure becomes zero is increased, if the residual pressure reduction control is executed only in this case, the cooperative braking control is executed efficiently. On the other hand, when the deviation of the actual torque from the required regenerative torque is larger than the permissible deviation, execution of the residual pressure reduction control is restricted.

As described above, the residual pressure reduction control may be executed regardless of whether the cooperative braking control is executed. The control unit may execute the residual pressure reduction control when a predetermined acceleration determination condition, under which there is a possibility that the vehicle is accelerated, is satisfied. Thus, it is possible to improve the response of the hydraulic pressure to the acceleration control that is subsequently executed, thereby improving an acceleration feel.

A second aspect of the invention relates to a brake apparatus including: a regenerative brake unit that generates a regenerative braking force by executing regenerative control over an electric motor; a hydraulic brake unit that generates a hydraulic braking force by executing hydraulic control over a hydraulic fluid; and a control unit that controls the regenerative brake unit and the hydraulic brake unit in such a manner that a required braking force, which is calculated based on a brake operation performed by a driver, is achieved. The control unit sets a dead-band region for a target hydraulic pressure that is used in the hydraulic control, and controls a hydraulic pressure of the hydraulic fluid using the dead-band region. When a predetermined residual pressure reduction condition for bringing an actual hydraulic pressure to the target hydraulic pressure is satisfied while the hydraulic pressure is decreased, the control unit sets a dead-band width of the dead-band region that is narrower than a dead-band width of the dead-band region that is used when the residual pressure reduction condition is not satisfied, and maintains the narrower dead-band width during a predetermined period.

The definitions of the "dead-band region", the "residual pressure reduction condition", and the "predetermined period" are as described above.

According to the second aspect of the invention, when the residual pressure reduction condition is satisfied, the dead-band width of the dead-band region is made narrower than that when the residual pressure reduction condition is not satisfied. As a result, it is possible to bring the actual hydraulic pressure to the target hydraulic pressure more promptly. For example, when the target hydraulic pressure is zero, for example, when the cooperative braking control is executed, the actual hydraulic pressure within the wheel cylinder is brought to a value substantially equal to zero. As a result, it is possible to suppress occurrence of brake drag. Temporarily narrowing the dead-band width in the above-described manner may arise a possibility that hunting occurs in the hydraulic control. However, if priority is given not to prevention of hunting but to reliable decrease of the hydraulic pressure to the target hydraulic pressure, employment of the brake apparatus according to the second aspect of the invention is considerably effective.

A third aspect of the invention relates to a brake control unit which is provided in a brake apparatus including a regenerative brake unit that generates a regenerative braking force by executing regenerative control over an electric motor, and a hydraulic brake unit that generates a hydraulic braking force by executing hydraulic control over a hydraulic fluid, and which controls the regenerative brake unit and the hydraulic brake unit in such a manner that a required braking force, which is calculated based on a brake operation performed by a driver, is achieved. The brake control unit sets a dead-band region for a target hydraulic pressure that is used in the hydraulic control, and controls a hydraulic pressure of the hydraulic fluid using the dead-band region. When a predetermined residual pressure reduction condition for bringing an actual hydraulic pressure to the target hydraulic pressure is satisfied while the hydraulic pressure is decreased, the brake control unit executes residual pressure reduction control in which the target hydraulic pressure is set to a value that is lower than an original value to which the hydraulic pressure needs to be brought and the set target hydraulic pressure that is lower than the original value is maintained during a predetermined period.

The definitions of the "dead-band region", the "residual pressure reduction condition", and the "predetermined period" are as described above. Application of the brake control unit according to the third aspect of the invention to the brake apparatus makes it possible to reliably bring the actual hydraulic pressure to the target hydraulic pressure. When the target hydraulic pressure is zero, it is possible to bring the actual hydraulic pressure within the wheel cylinder to zero, thereby suppressing occurrence of brake drag.

A fourth aspect of the invention relates to a brake control unit which is provided in a brake apparatus including a regenerative brake unit that generates a regenerative braking force by executing regenerative control over an electric motor, and a hydraulic brake unit that generates a hydraulic braking force by executing hydraulic control over a hydraulic fluid, and which controls the regenerative brake unit and the hydraulic brake unit in such a manner that a required braking force, which is calculated based on a brake operation performed by a driver, is achieved. The brake control unit sets a dead-band region for a target hydraulic pressure that is used in the hydraulic control, and controls a hydraulic pressure of the hydraulic fluid using the dead-band region. When a predetermined residual pressure reduction condition for bringing an actual hydraulic pressure to the target hydraulic pressure is satisfied while the hydraulic pressure is decreased, the brake control unit sets a dead-band width of the dead-band region that is narrower than a dead-band width of the dead-band region that is used when the residual pressure reduction condition is not satisfied, and maintains the narrower dead-band width during a predetermined period.

The definitions of the "dead-band region", the "residual pressure reduction condition", and the "predetermined period" are as described above. Application of the brake control unit according to the fourth aspect of the invention to the brake apparatus makes it possible to promptly bring the actual hydraulic pressure to the target hydraulic pressure. When the target hydraulic pressure is zero, it is possible to bring the actual hydraulic pressure within the wheel cylinder to a value substantially equal to zero, thereby suppressing occurrence of brake drag.

A fifth aspect of the invention relates to a brake control method including cooperative braking control in which regenerative control that is executed over an electric motor and hydraulic control that is executed over a hydraulic fluid are executed in a coordinated manner. According to the brake control method, a required braking force is calculated based on a brake operation performed by a driver, an allocation ratio between a braking force that needs to be generated by the regenerative control and a braking force that needs to be generated by the hydraulic control is determined in order to achieve the required braking force, and the control is executed based on the allocation ratio. A dead-band region is set for a target hydraulic pressure that is used in the hydraulic control, and a hydraulic pressure of the hydraulic fluid is controlled using the dead-band region when the hydraulic control is executed under normal conditions. When a predetermined residual pressure reduction condition for bringing an actual hydraulic pressure to the target hydraulic pressure is satisfied while the hydraulic pressure is decreased during the hydraulic control, residual pressure reduction control is executed. In the residual pressure reduction control, the target hydraulic pressure is set to a value that is lower than an original value to which the target hydraulic pressure needs to be brought and the set target hydraulic pressure that is lower than the original value is maintained during a predetermined period.

The definitions of the "dead-band region", the "residual pressure reduction condition", and the "predetermined period" are as described above. Application of the brake control method according to the fifth aspect of the invention to the brake apparatus makes it possible to reliably bring the actual hydraulic pressure to the target hydraulic pressure. When the target hydraulic pressure is zero, it is possible to bring the actual hydraulic pressure within the wheel cylinder to zero, thereby suppressing occurrence of brake drag.

A sixth aspect of the invention relates to a brake control method including cooperative braking control in which regenerative control that is executed over an electric motor and hydraulic control that is executed over a hydraulic fluid are executed in a coordinated manner. According to the brake control method, a required braking force is calculated based on a brake operation performed by a driver, an allocation ratio between a braking force that needs to be generated by the regenerative control and a braking force that needs to be generated by the hydraulic control is determined in order to achieve the required braking force, and the control is executed based on the allocation ratio. A dead-band region is set for a target hydraulic pressure that is used in the hydraulic control, and a hydraulic pressure of the hydraulic fluid is controlled using the dead-band region when the hydraulic control is executed under normal conditions. When a predetermined residual pressure reduction condition for bringing an actual hydraulic pressure to the target hydraulic pressure is satisfied while the hydraulic pressure is decreased during the hydraulic control, a dead-band width of the dead-band region is set to a dead-band width that is narrower than a dead-band width of the dead-band region that is used when the residual pressure reduction condition is not satisfied and the narrower dead-band width is maintained during a predetermined period.

The definitions of the "dead-band region", the "residual pressure reduction condition", and the "predetermined period" are as described above. Application of the brake control method according to the sixth aspect of the invention to the brake apparatus makes it possible to promptly bring the actual hydraulic pressure to the target hydraulic pressure. When the target hydraulic pressure is zero, it is possible to bring the actual hydraulic pressure within the wheel cylinder to a value substantially equal to zero, thereby suppressing occurrence of brake drag.

According to the aspects of the invention described above, it is possible provide the brake control technology according to which the target hydraulic pressure is reliably achieved when the hydraulic pressure is decreased during a hydraulic control and brake drag does not occur even when the target hydraulic pressure is zero.

BRIEF DESCRIPTION OF THE DRAWINGS

The foregoing and further features and advantages of the invention will become apparent from the following description of example embodiments with reference to the accompanying drawings, wherein the same or corresponding portions will be denoted by the same reference numerals and wherein.

DETAILED DESCRIPTION OF THE EXAMPLE EMBODIMENTS

Hereafter, example embodiments of the invention will be described with reference to the accompanying drawings.

First Embodiment of the Invention

Figure 1:
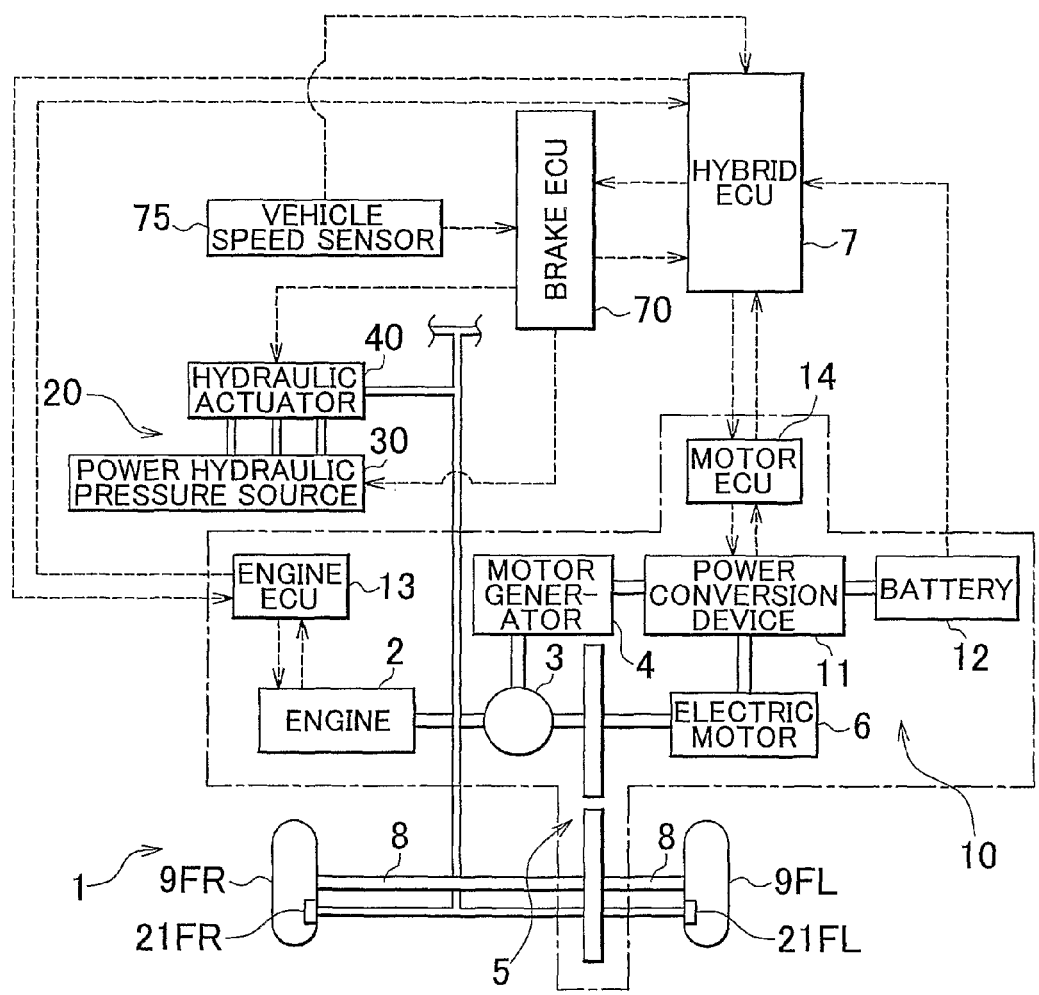
FIG. 1 is a view schematically showing the structure of a vehicle provided with a brake apparatus according to a first embodiment of the invention.

FIG. 1 is a view schematically showing a vehicle 1 provided with a brake apparatus according to a first embodiment of the invention. The vehicle 1 is a so-called hybrid vehicle. The vehicle 1 includes an engine 2, a three-axis power split mechanism 3 that is connected to a crankshaft which serves as an output shaft of the engine 2, a motor generator 4 that is connected to the power split mechanism 3 and that is able to generate electric power, an electric motor 6 that is connected to the power split mechanism 3 via a transmission 5, and electronic control units (hereinafter, referred to as "ECUs") that control respective actuator. That is, as control units for the vehicle 1, there are provided a hybrid ECU 7 that controls the entirety of a drive system, an engine ECU 13 that controls the engine 2, a motor ECU 14 that controls each motor, and a brake ECU 70 that controls a brake. Each ECU is formed of a microprocessor that includes a CPU. Each ECU includes, in addition to the CPU, a ROM that stores various programs, a RAM that temporarily stores data, an input port, an output port, and a communication port. A front right wheel 9FR and a front left wheel 9FL, which serve as drive wheels of the vehicle 1, are connected to the transmission 5 via a drive shaft 8.

The engine 2 is an internal combustion engine that is driven using hydrocarbon fuel, for example, gasoline or diesel oil. The engine 2 is controlled by the engine ECU 13. The engine ECU 13 communicates with the hybrid ECU 7, and executes various controls over the engine 2 such as fuel injection control, ignition control and intake air control based on control signals from the hybrid ECU 7 and signals from various sensors that detect the operating state of the engine 2. The engine ECU 13 provides the hybrid ECU 7 with information concerning the operating state of the engine 2 on an as-required basis.

The power split mechanism 3 has a function of transferring drive power output from the electric motor 6 to the front right and left wheels 9FR and 9FL via the transmission 5, a function of distributing drive power output from the engine 2 between the motor generator 4 and the transmission 5, and a function of decreasing or increasing the rotational speed of the electric motor 6 and the rotational speed of the engine 2. Each of the motor generator 4 and the electric motor 6 is connected to a battery 12 via a power conversion device 11 that includes an inverter. The motor ECU 14 is connected to the power conversion device 11. As the battery 12, an accumulator battery, for example, a nickel hydride battery, may be used. The motor ECU 14 also communicates with the hybrid ECU 7. The motor ECU 14 controls the motor generator 4 and the electric motor 6 via the power conversion device 11 based on control signals from the hybrid ECU 7.

The electric power is supplied from the battery 12 to the electric motor 6 via the power conversion device 11 under the controls of the hybrid ECU 7 and the motor ECU 14, whereby the front right and left wheels 9FR and 9FL are driven using the drive power output from the electric motor 6. When the engine operating state is within an operating region in which the engine efficiency is high, the vehicle 1 is driven by the engine 2. In this case, if a portion of the drive power output from the engine 2 is transferred to the motor generator 4 via the power split mechanism 3, it is possible to drive the electric motor 6 or to supply electric power to the battery 12 via the power conversion device 11, using the electric power generated by the motor generator 4.

The vehicle 1 is provided with a vehicle speed sensor 75 that detects a traveling speed of the vehicle 1. The vehicle speed sensor 75 detects a traveling speed of the vehicle 1, and periodically transmits a signal indicating the detected traveling speed to, for example, the hybrid ECU 7 and the brake ECU 70 at predetermined time intervals. A typical example of the vehicle speed sensor 75 is a wheel speed sensor that is fitted to each wheel.

When brakes are applied to the vehicle 1, the electric motor 6 is rotated by the drive power transferred from the front wheels 9FR and 9FL and the electric motor 6 is operated as an electric power generator under the controls of the hybrid ECU 7 and the motor ECU 14. That is, the electric motor 6, the power conversion device 11, the hybrid ECU 7, the motor ECU 14, etc. serve as a regenerative brake unit 10 that applies braking forces to the front right and left wheels 9FR and 9FL by converting kinetic energy of the vehicle 1 into electric energy. The vehicle 1 is provided with a hydraulic brake unit 20 in addition to the regenerative brake unit 10. The hydraulic brake unit 20 includes a power hydraulic pressure source 30 and a hydraulic actuator 40.

Figure 2:
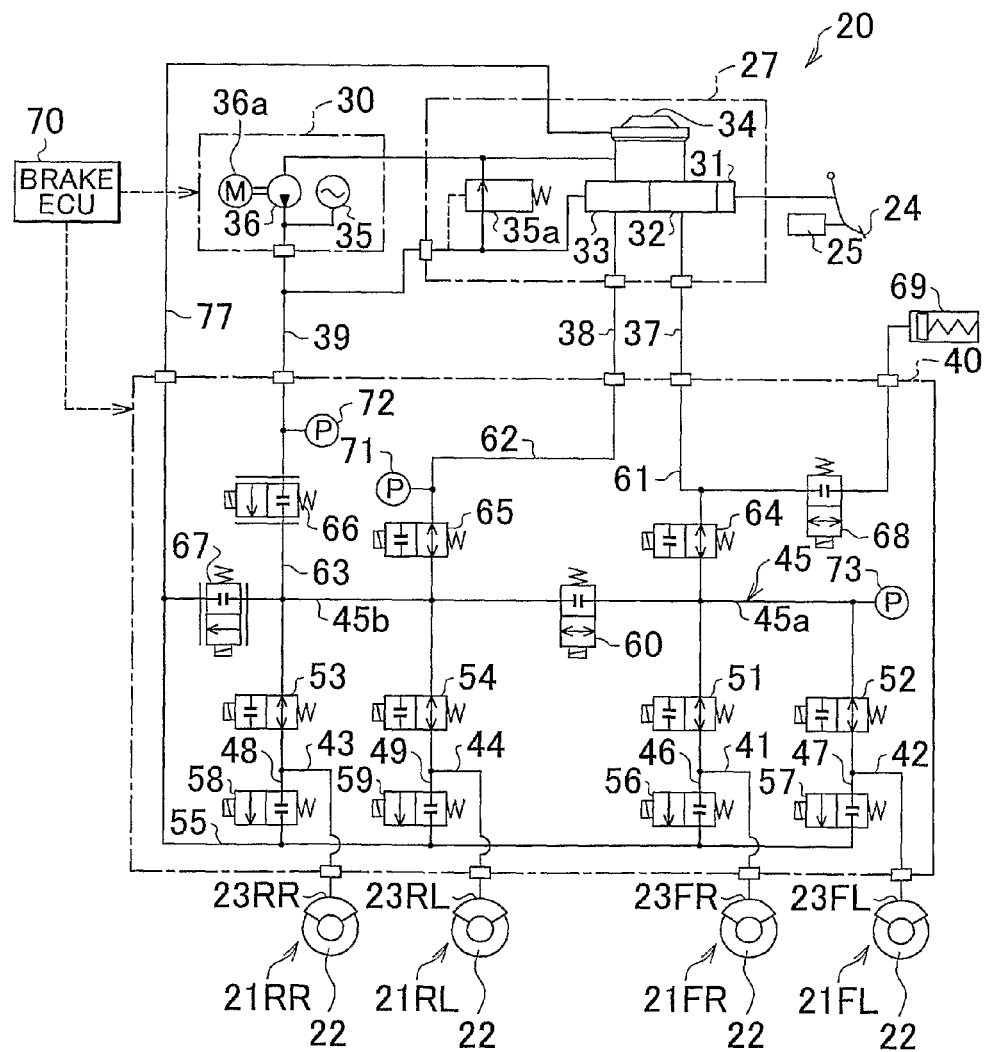
FIG. 2 is a system diagram of the brake apparatus, mainly showing a hydraulic brake unit.

FIG. 2 is a system diagram of the brake apparatus, mainly showing the hydraulic brake unit 20. The hydraulic brake unit 20 includes disk brake units 21FR, 21FL, 21RR and 21RL, a master cylinder unit 27, the power hydraulic pressure source 30, the hydraulic actuator 40 and a hydraulic circuit that connects theses components with each other.

The disk brake units 21FR, 21FL, 21RR and 21RL apply braking forces to the front right wheel 9FR, the front left wheel 9FL, a rear right wheel (not shown), and a rear left wheel (not shown), respectively. The master cylinder unit 27, which serves as a manual hydraulic pressure source, delivers the brake fluid, which is the hydraulic fluid that is pressurized in accordance with an amount by which a driver operates a brake pedal 24 that serves as a brake operation member, to disk brake units 21FR to 21 RL. The power hydraulic pressure source 30 is able to deliver the brake fluid, which is pressurized by the power supplied thereto, to the disk brake units 21FR to 21RL independently of the operation of the brake pedal 24 performed by the driver. The hydraulic actuator 40 adjusts the hydraulic pressure of the brake fluid that is supplied from the power hydraulic pressure source 30 or the master cylinder unit 27 to an appropriate pressure, and then delivers the brake fluid to the disk brake units 21FR to 21 RL. Thus, the braking forces that are applied to the respective wheels under the hydraulic braking control are adjusted.

The disk brake units 21FR to 21RL include brake disks 22 and wheel cylinders 23FR to 23RL that are embedded in brake calipers, respectively. The wheel cylinders 23FR to 23RL are connected to the hydraulic actuator 40 via respective fluid passages. Hereafter, the wheel cylinders 23FR to 23RL will be collectively referred to as "wheel cylinders 23" where appropriate.

In the disk brake units 21FR to 21RL, when the brake fluid from the hydraulic actuator 40 is supplied to the wheel cylinder 23, a brake pad, which serves as a friction member, is pushed against the brake disk 22 that rotates together with the wheel. Thus, braking forces are applied to the respective wheels. In the first embodiment of the invention, the disk brake units 21FR to 21RL are used. Alternatively, other braking force application mechanism that include the wheel cylinders 23, for example, drum brakes may be used.

In the first embodiment of the invention, the master cylinder unit 27 is provided with a hydraulic pressure booster. The master cylinder unit 27 includes a hydraulic pressure booster 31, a master cylinder 32, a regulator 33, and a reservoir 34. The force applied to the brake pedal 24 by the driver is mechanically transferred and the brake fluid in the master cylinders 32 is pressurized. The hydraulic pressure booster 31 is connected to the brake pedal 24, and amplifies the pedal depression force applied to the brake pedal 24 by the driver and then transfers the amplified pedal depression force to the master cylinders 32. The pedal depression force is amplified by supplying the brake fluid from the power hydraulic pressure source 30 to the hydraulic pressure booster 31 through the regulator 33. Then, the master cylinder 32 generates master cylinder pressure corresponding to a value obtained by amplifying the pedal depression force by predetermined number of times.

The reservoir 34 that stores the brake fluid is provided above the master cylinder 32 and the regulator 33. The master cylinder 32 communicates with the reservoir 34 when the brake pedal 24 is not depressed. The regulator 33 communicates with both the reservoir 34 and an accumulator 35 of the power hydraulic pressure source 30. The regulator 33 generates a fluid pressure that is substantially equal to the master cylinder pressure using the reservoir 34 as a low-pressure source and the accumulator 35 as a high-pressure source. Hereinafter, the hydraulic pressure in the regulator 33 will be referred to as the "regulator pressure" where appropriate. Note that, the master cylinder pressure and the regulator pressure need not be exactly equal to each other. For example, the master cylinder unit 27 may be designed in such a manner that the regulator pressure is slightly higher than the master cylinder pressure.

The power hydraulic pressure source 30 includes the accumulator 35 and a pump 36. The accumulator 35 converts the pressure energy of the brake fluid pressurized by the pump 36 into the pressure energy of the filler gas such as nitrogen, for example, the pressure energy having a pressure of approximately 14 MPa to approximately 22 MPa, and stores the pressure energy. The pump 36 has a motor 36a that serves as a drive power source. An inlet of the pump 36 is connected to the reservoir 34, and an outlet thereof is connected to the accumulator 35. The accumulator 35 is connected also to a relief valve 35a provided in the master cylinder unit 27. When the pressure of the brake fluid in the accumulator 35 abnormally increases and becomes, for example, approximately 25 MPa, the relief valve 35a opens, and the brake fluid having a high pressure is returned to the reservoir 34.

As described above, the hydraulic brake unit 20 includes the master cylinder 32, the regulator 33, and the accumulator 35 that serve as brake fluid supply sources from which the brake fluid is supplied to the wheel cylinders 23. A master pipe 37 is connected to the master cylinder 32. A regulator pipe 38 is connected to the regulator 33. An accumulator pipe 39 is connected to the accumulator 35. The master pipe 37, the regulator pipe 38 and the accumulator pipe 39 are connected to the hydraulic actuator 40.

The hydraulic actuator 40 includes an actuator block having a plurality of passages formed therein, and a plurality of electromagnetically-controlled valves. Examples of the passages formed in the actuator block include individual passages 41, 42, 43 and 44 and a main passage 45. The individual passages 41, 42, 43 and 44 branch off from the main passage 45, and are connected to the wheel cylinders 23FR, 23FL, 23RR and 23RL of the disk brake units 21FR, 21FL, 21RR and 21RL, respectively. Thus, communication is provided between the wheel cylinders 23 and the main passage 45.

ABS maintaining valves 51, 52, 53 and 54 are provided at the middle portions of the individual passages 41, 42, 43 and 44, respectively. Each of the ABS maintaining valves 51, 52, 53 and 54 includes a solenoid subjected to the ON/OFF control and a spring, and is a normally-open electromagnetically-controlled valve that is open when electric power is not supplied to the solenoid. Each of the ABS maintaining valves 51 to 54 allows the brake fluid to flow in either direction, when it is open. Namely, each of the ABS maintaining valves 51 to 54 allows the brake fluid to flow from the main passage 45 to the wheel cylinders 23, and also allows the brake fluid to flow from the wheel cylinders 23 to the main passage 45. When electric power is supplied to the solenoids and the ABS maintaining valves 51 to 54 are closed, the flow of the brake fluid through the individual passages 41 to 44 is shut off.

In addition, the wheel cylinders 23 are connected to a reservoir passage 55 via pressure-decreasing passages 46, 47, 48 and 49 connected to the individual passages 41, 42, 43 and 44, respectively. ABS pressure-decreasing valves 56, 57, 58 and 59 are provided at the middle portions of the pressure-decreasing passages 46, 47, 48 and 49, respectively. Each of the ABS pressure-decreasing valves 56 to 59 includes a solenoid subjected to the ON/OFF control and a spring, and is a normally-closed electromagnetically-controlled valve that is closed when electric power is not supplied to the solenoid. When the ABS pressure-decreasing valves 56 to 59 are closed, the flow of the brake fluid through the pressure-decreasing passages 46 to 49 is shut off. When electric power is supplied to the solenoids and the ABS pressure-decreasing valves 56 to 59 are opened, the brake fluid flows through the pressure-decreasing passages 46 to 49, and the brake fluid is returned from the wheel cylinders 23 to the reservoir 34 through the pressure-decreasing passages 46 to 49 and the reservoir passage 55. The reservoir passage 55 is connected to the reservoir 34 of the master cylinder unit 27 via a reservoir pipe 77.

A partition valve 60 is provided at the middle portion of the main passage 45. The main passage 45 is partitioned into a first passage 45*a* that is connected to the individual passages 41 and 42, and a second passage 45*b* that is connected to the individual passages 43 and 44, when the partition valve 60 is closed. The first passage 45*a* is connected to the wheel cylinders 23FR and the 23FL for the front wheels via the individual passages 41 and 42, respectively. The second passage 45*b* is connected to the wheel cylinders 23RR and 23RL for the rear wheels via the individual passages 43 and 44, respectively.

The partition valve 60 includes a solenoid subjected to the ON/OFF control and a spring, and is a normally-closed changeover valve that is closed when electric power is not supplied to the solenoid. When the partition valve 60 is closed, the flow of the brake fluid through the main passage 45 is shut off. When electric power is supplied to the solenoid and the partition valve 60 is opened, the brake fluid flows between the first passage 45*a* and the second passage 45*b* in either direction.

In the hydraulic actuator 40, a master passage 61 and a regulator passage 62, which communicate with the main passage 45, are formed. More specifically, the master passage 61 is connected to the first passage 45*a* of the main passage 45, and the regulator passage 62 is connected to the second passage 45*b* of the main passage 45. The master passage 61 is connected to the master pipe 37 that communicates with the master cylinder 32. The regulator passage 62 is connected to the regulator pipe 38 that communicates with the regulator 33.

A master cut valve 64 is provided at the middle portion of the master passage 61. The master cut valve 64 is provided on a path through which the brake fluid is supplied from the master cylinder 32 to each wheel cylinder 23. The master cut valve 64 includes a solenoid subjected to the ON/OFF control and a spring, and is a normally-open changeover valve that is reliably closed by an electromagnetic force which is generated by the solenoid upon reception of a prescribed control current and that is open when electric power is not supplied to the solenoid. When the master cut valve 64 is open, the brake fluid flows between the master cylinder 32 and the first passage 45*a* of the main passage 45 in either direction. When the prescribed control current is supplied to the solenoid and the master cut valve 64 is closed, the flow of the brake fluid through the master passage 61 is shut off.

A stroke simulator 69 is connected to the master passage 61 via a simulator cut valve 68 that serves as a changeover valve, at a position upstream of the master cut valve 64. Namely, the simulator cut valve 68 is provided on the passage that connects the master cylinder 32 to the stroke simulator 69. The simulator cut valve 68 includes a solenoid subjected to the ON/OFF control and a spring, and is a normally-closed changeover valve that is reliably open due to an electromagnetic force which is generated by the solenoid upon reception of a prescribed control current and that is closed when electric power is not supplied to the solenoid. When the simulator cut valve 68 is closed, the flow of the brake fluid through the master passage 61 between the simulator cut valve 68 and the stroke simulator 69 is shut off. When electric power is supplied to the solenoid and the simulator cut valve 68 is opened, the brake fluid flows between the master cylinder 32 and the stroke simulator 69 in either direction.

The stroke simulator 69 includes a plurality of pistons and a plurality of springs. When the simulator cut valve 68 is opened, the stroke simulator 69 generates a reaction force corresponding to the depression force applied to the brake pedal 24 by the driver. Preferably, a stroke simulator that has multi-stage spring characteristics is used as the stroke simulator 69 in order to improve the brake pedal operating feel felt by the driver.

A regulator cut valve 65 is provided at the middle portion of the regulator passage 62. The regulator cut valve 65 is provided on a path through which the brake fluid is supplied from the regulator 33 to each wheel cylinder 23. The regulator cut valve 65 also includes a solenoid subjected to the ON/OFF control and a spring, and is a normally-open changeover valve that is reliably closed by an electromagnetic force which is generated by the solenoid upon reception of a prescribed control current and that is open when electric power is not supplied to the solenoid. When the regulator cut valve 65 is open, the brake fluid flows between the regulator 33 and the second passage 45*b* of the main passage 45 in either direction. When electric power is supplied to the solenoid and the regulator cut valve 65 is closed, the flow of the brake fluid through the regulator passage 62 is shut off.

In addition to the master passage 61 and the regulator passage 62, an accumulator passage 63 is formed in the hydraulic actuator 40. One end of the accumulator passage 63 is connected to the second passage 45*b* of the main passage 45, and the other end thereof is connected to the accumulator pipe 39 that communicates with the accumulator 35.

A pressure-increasing linear control valve 66 is provided at the middle portion of the accumulator passage 63. The accumulator passage 63 and the second passage 45*b* of the main passage 45 are connected to the reservoir passage 55 via a pressure-decreasing linear control valve 67. Each of the pressure-increasing linear control valve 66 and the pressure-decreasing linear control valve 67 has a linear solenoid and a spring, and is a normally-closed electromagnetically-controlled valve that is closed when electric power is not supplied to the linear solenoid. The opening amounts of the pressure-increasing linear control valve 66 and the pressure-decreasing control valve 67 are adjusted in proportion to the magnitudes of electric currents supplied to the respective linear solenoids.

The pressure-increasing linear control valve 66 is shared by the multiple wheel cylinders 23 corresponding to the respective wheels. Similarly, the pressure-decreasing linear control valve 67 is shared by the multiple wheel cylinders 23.

Namely, according to the first embodiment of the invention, the pressure-increasing linear control valve 66 and the pressure-decreasing linear control valve 67 are provided as a pair of control valves that are shared by the wheel cylinders 23 and that control the hydraulic fluid supplied from the power hydraulic pressure source 30 to the wheel cylinders 23 and the hydraulic fluid returned from the wheel cylinders 23 to the power hydraulic pressure source 30. In terms of cost performance, providing one pressure-increasing linear control valve 66 that is shared by the multiple wheel cylinders 23 is better than providing linear control valves for the respective wheel cylinders 23.

The pressure difference between an inlet and an outlet of the pressure-increasing linear control valve 66 corresponds to the difference between the pressure of the brake fluid in the accumulator 35 and the pressure of the brake fluid in the main passage 45. The pressure difference between an inlet and an outlet of the pressure-decreasing linear control valve 67 corresponds to the difference between the pressure of the brake fluid in the main passage 45 and the pressure of the brake fluid in the reservoir 34. When the electromagnetic drive power corresponding to the electric power supplied to the linear solenoid of each of the pressure-increasing linear control valve 66 and the pressure-decreasing linear control valve 67 is F1, the biasing force of the spring of each of the pressure-increasing linear control valve 66 and the pressure-decreasing linear control valve 67 is F2, and the differential pressure acting force corresponding to the pressure difference between the inlet and the outlet of each of the pressure-increasing linear control valve 66 and the pressure-decreasing linear control valve 67 is F3, the equation, F1+F3=F2, is satisfied. Accordingly, the pressure difference between the inlet and the outlet of each of the pressure-increasing linear control valve 66 and the pressure-decreasing linear control valve 67 is controlled by continuously controlling the electric power supplied to the linear solenoid of each of the pressure-increasing linear control valve 66 and the pressure-decreasing linear control valve 67.

In the hydraulic brake unit 20, the power hydraulic pressure source 30 and the hydraulic actuator 40 are controlled by the brake ECU 70. The brake ECU 70 communicates with the hybrid ECU, etc. at a higher level. The brake ECU 70 controls the pump 36 of the power hydraulic pressure source 30, the electromagnetically-controlled valves 51 to 54, 56 to 59, 60, and 64 to 68 that form the hydraulic actuator 40 based on the control signals from the hybrid ECU 7 and the signals from various sensors.

A regulator pressure sensor 71, an accumulator pressure sensor 72, and a control pressure sensor 73 are connected to the brake ECU 70. The regulator pressure sensor 71 is provided upstream of the regulator cut valve 65. The regulator pressure sensor 71 detects the pressure of the brake fluid in the regulator passage 62, namely, the regulator pressure, and transmits a signal indicating the detected regulator pressure to the brake ECU 70. The accumulator pressure sensor 72 is provided upstream of the pressure-increasing linear control valve 66. The accumulator pressure sensor 72 detects the pressure of the brake fluid in the accumulator passage 63, namely, the accumulator pressure, and transmits a signal indicating the detected accumulator pressure to the brake ECU 70. The control pressure sensor 73 detects the pressure of the brake fluid in the first passage 45a of the main passage 45, and transmits a signal indicating the detected brake fluid pressure to the brake ECU 70. The signals indicating the values detected by the regulator pressure sensor 71, the accumulator pressure sensor 72, and the control pressure sensor 73 are transmitted to the braked ECU 70 at predetermined time intervals, and stored in a predetermined storage region of the brake ECU 70.

When the partition valve 60 is open and the first passage 45a and the second passage 45b of the main passage 45 communicate with each other, the value output from the control pressure sensor 73 indicates the lower hydraulic pressure at the pressure-increasing linear control valve 66 and the higher hydraulic pressure at the pressure-decreasing linear control valve 67. Accordingly, the value output from the control pressure sensor 73 is used to control the pressure-increasing linear control valve 66 and the pressure-decreasing linear control valve 67. When the pressure-increasing linear control valve 66 and the pressure-decreasing linear control valve 67 are both closed and the master cut valve 64 is open, the value output from the control pressure sensor 73 indicates the master cylinder pressure. When the partition valve 60 is open and the first passage 45a and the second passage 45b of the main passage 45 communicate with each other, and the ABS maintaining valves 51 to 54 are open while the ABS pressure-decreasing valves 56 to 59 are closed, the value output from the control pressure sensor 73 indicates the hydraulic fluid pressure that is applied to each of the wheel cylinders 23, namely, the wheel cylinder pressure.

Examples of the sensors that are connected to the brake ECU 70 include a stroke sensor 25 fitted to the brake pedal 24. The stroke sensor 25 detects a brake pedal stroke that is an operation amount of the brake pedal 24, and transmits a signal indicating the detected brake pedal stroke to the brake ECU 70. The value output from the stroke sensor 25 is transmitted to the brake ECU 70 at predetermined time intervals, and stored in a predetermined storage region of the brake ECU 70. Brake operation state detection means other than the stroke sensor 25 may be provided in addition to or instead of the stroke sensor 25 and may be connected to the brake ECU 70. Examples of the brake operation state detection means include a pedal depression force sensor that detects an operation force applied to the brake pedal 24 and a brake switch that detects depression of the brake pedal 24.

The thus configured hydraulic brake unit 20 executes the cooperative braking control in cooperation with the regenerative brake unit 10. In the cooperative braking control, the hydraulic braking control by the hydraulic brake unit 20 and the regenerative braking control by the regenerative brake unit 10 are executed in a coordinated manner. A brake control unit that functions as a control unit for the brake apparatus according to the first embodiment of the invention includes the hybrid ECU 7, the brake ECU 70, the motor ECU 14, etc.

The hydraulic brake unit 20 starts braking control upon reception of a braking command. A braking command is issued when brakes should be applied to the vehicle, for example, when the driver operates the brake pedal 24. The brake ECU 70 calculates a required braking force (corresponding to "required torque" described later) upon reception of the braking command, and calculates a required hydraulic braking force, which is a hydraulic braking force that should be generated by the hydraulic brake unit 20, by subtracting a regenerative braking force from the required braking force. The brake ECU 70 calculates target hydraulic pressures for the wheel cylinders 23FR to 23RL based on the calculated required hydraulic braking force. The brake ECU 70 determines values of control currents that are supplied to the pressure-increasing linear control valve 66 and the pressure-decreasing linear control valve 67 by executing feedback control in such a manner that the wheel cylinder pressures match the respective target hydraulic pressures.

As a result, in the hydraulic brake unit 20, the brake fluid is supplied from the power hydraulic pressure source 30 to each wheel cylinder 23 via the pressure-increasing linear control valve 66, whereby braking forces are applied to the wheels. Also, the brake fluid is returned from each wheel cylinder 23 to the power hydraulic pressure source 30 via the pressure-decreasing linear control valve 67, whereby the braking forces that are applied to the wheels are adjusted. In the first embodiment of the invention, the power hydraulic pressure source 30, the pressure-increasing linear control valve 66, the pressure-decreasing linear control valve 67, etc. constitute a wheel cylinder pressure control system. The wheel cylinder pressure control system executes so-called brake-by-wire braking force control. The wheel cylinder pressure control system is arranged in parallel with the path through which the brake fluid is supplied from the master cylinder unit 27 to the wheel cylinders 23. At this time, the brake ECU 70 keeps the regulator cut valve 65 and the master cut valve 64 closed so that the brake fluid that is delivered from the regulator 33 and the master cylinder 32 is not supplied to the wheel cylinders 23.

The brake ECU 70 receives a signal indicating a power generation-side upper limit value, which is an upper limit valve of the regenerative braking force that is determined based on, for example, the rotational speed of the electric motor 6, and a signal indicating a storage-side upper limit value, which is an upper limit value that is determined based on, for example, the charging capacity of the battery 12. That is, the upper limit value of the regenerative braking force that can be required is the smaller value from among the power generation-side upper limit value and the storage-side upper limit value. The smaller upper limit value is used as a regeneration MAX guard value, which will be described later in detail. The brake ECU 70 determines a required regenerative braking force (corresponding to "required regeneration torque"). If the required braking force is below the regeneration MAX guard value, the required regenerative braking force is set to the required braking force. On the other hand, if the required braking force is equal to or above the regeneration MAX guard value, the regenerative braking force is set to the regeneration MAX guard value. The brake ECU 70 then transmits a regenerative braking command to the hybrid ECU 7.

The hybrid ECU 7 transmits a signal indicating the required regenerative braking force to the motor ECU 14. The motor ECU 14 transmits a control command to the power conversion device 11 so that the braking force that is applied to each of the front right and left wheels 9FR and 9FL matches the required regenerative braking force. The power conversion device 11 controls the electric motor 6 based on a command from the motor ECU 14. Thus, the kinetic energy of the vehicle 1 is converted into electric energy, and the electric energy is supplied to the battery 12 via the power conversion device 11 and stored in the battery 12. The energy stored in the battery 12 is used to, for example, drive the wheels. As a result, the fuel efficiency of the vehicle is enhanced.

The motor ECU 14 obtains the information concerning the actual operating state of the regenerative brake unit 10 such as the rotational speed of the electric motor 6, and transmits the information to the hybrid ECU 7. The hybrid ECU 7 calculates an actual regenerative braking force (corresponding to "actual torque" described later in detail) that is actually applied to each wheel based on the actual operating state of the regenerative brake unit 10, and transmits a signal indicating the actual regenerative braking force to the brake ECU 70.

The brake ECU 70 calculates the required hydraulic braking force that should be generated by the hydraulic brake unit 20, by subtracting the actual regenerative braking force from the required braking force. In addition, the brake ECU 70 calculates a target hydraulic pressure for the hydraulic fluid in the disk brake unit 21 based on the required hydraulic braking force. The brake ECU 70 controls the hydraulic brake unit 20 so that the hydraulic pressure of the hydraulic fluid matches the target hydraulic pressure. Thus, hydraulic braking forces are applied to the respective wheels.

Figure 3:
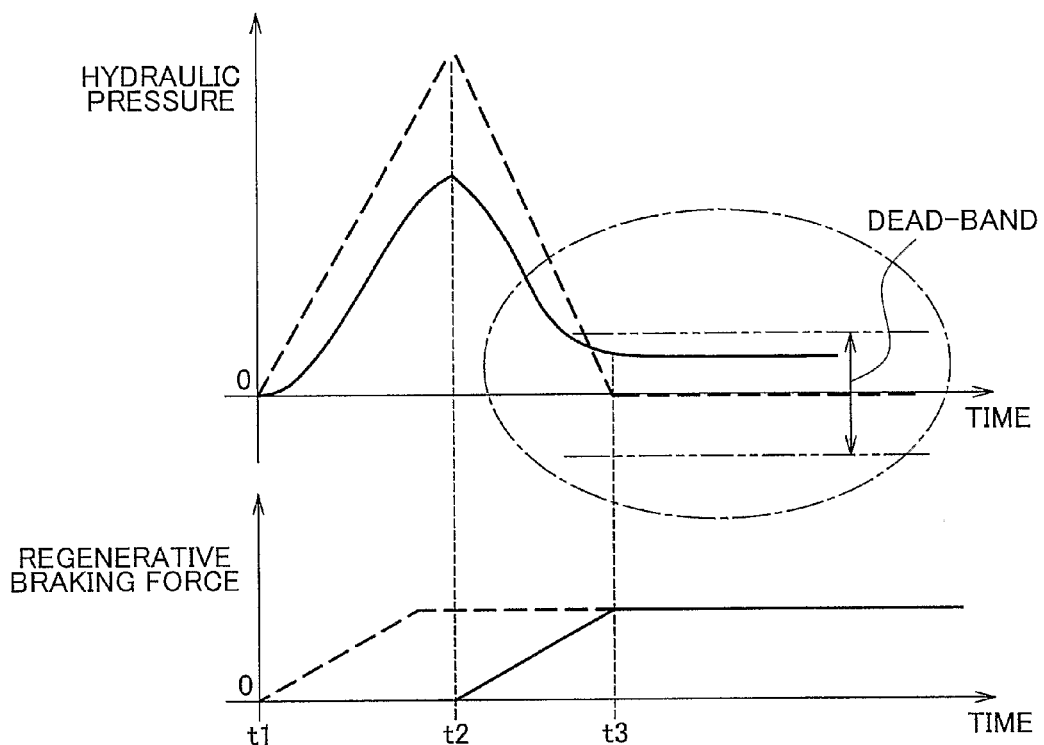
FIG. 3 is a graph showing a problem that occurs when cooperative braking control is executed.

Next, a method for executing the cooperative braking control according to the first embodiment of the invention will be described. FIG. 3 is a graph showing a problem that occurs when the cooperative braking control is executed. FIG. 3 shows the state when the braking control is switched from the hydraulic braking control to the regenerative braking control. The upper portion of FIG. 3 shows the target hydraulic pressure (indicated by a dashed line) for the hydraulic fluid and the actual hydraulic pressure (indicated by a solid line) that is the actual hydraulic pressure in the hydraulic braking control. The lower portion of FIG. 3 shows the required regenerative braking force (indicated by a dashed line) and the actual regenerative braking force that is the actual regenerative braking force. The abscissa axis in FIG. 3 represents a lapse of time.

As shown in FIG. 3, when the braking control is switched from the hydraulic braking control to the regenerative braking control, the hydraulic pressure that is achieved by the hydraulic braking control is temporarily raised by a large amount upon issuance of a regenerative braking command. Even if a regenerative braking command is issued, a desired regenerative braking force is not achieved immediately and there is a time lag between when the regenerative braking command is issued and when the desired regenerative braking force is achieved. Therefore, the hydraulic pressure that is achieved by the hydraulic braking control is temporarily raised by a large amount so that a sufficient braking force is achieved during the period until the desired regenerative braking force is achieved. After a sufficient hydraulic braking force is achieved, the hydraulic braking force is gradually decreased to gradually switch the braking control from the hydraulic braking control to the regenerative braking control. In an example shown in FIG. 3, the target hydraulic pressure is raised upon issuance of a regenerative braking command and a required value (required regenerative braking force) at time t1. From time t2 at which the actual regenerative braking force as an actual regenerative braking force value starts rising, the target hydraulic pressure is decreased. In this case, the target hydraulic pressure is set to zero to switch the braking control from the hydraulic braking control to the regenerative braking control. The actual regenerative braking control reaches the required regenerative braking force at time t3.

However, in the hydraulic braking control, a predetermined-width (for example, approximately 0.13 Mpa) deadband region is set for the target hydraulic pressure to prevent occurrence of hunting in the hydraulic pressure. In FIG. 3, the region between chain double-dashed lines is the dead-band region that is set for the target hydraulic pressure of zero. When the actual hydraulic pressure enters the dead-band region, it is determined that the target hydraulic pressure is achieved in the control. Therefore, even if the target hydraulic pressure is set to zero, the actual hydraulic pressure does not become zero. That is, the wheel cylinder pressure does not become zero and the brake drag occurs.

Figure 4:
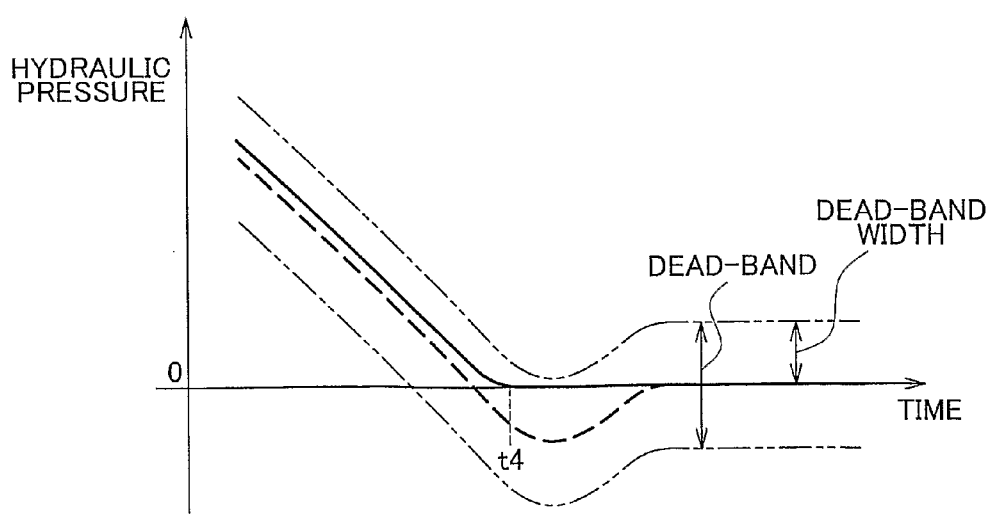
FIG. 4 is a graph showing a main portion of the cooperative braking control according to the first embodiment of the invention.

Therefore, according to the first embodiment of the invention, the wheel cylinder pressure is reliably brought to zero when the hydraulic pressure is decreased in the cooperative braking control. FIG. 4 is a graph showing a main portion of the cooperative braking control according to the first embodiment of the invention. FIG. 4 shows the state when the hydraulic pressure is decreased while the braking control is switched from the hydraulic braking control to the regenerative braking control in the cooperative braking control. FIG. 4 shows the state after time t2 in FIG. 3 (the state indicated by a chain line). FIG. 4 shows the target hydraulic pressure (indicated by a dashed line) and the actual hydraulic pressure (indicated by a solid line) of the hydraulic fluid in the hydraulic braking control. The region between chain double-dashed lines is the dead-band region. The abscissa axis in FIG. 4 represents a lapse of time.

According to the first embodiment of the invention, residual pressure reduction control is executed. The original target value of the hydraulic pressure (actual target hydraulic pressure) is zero. In contrast, as shown in FIG. 4, in the residual pressure reduction control, a residual pressure reduction target value (tentative target hydraulic pressure) is set by setting the target hydraulic pressure to a negative value (<0). Then, the target hydraulic pressure is reset to zero after the actual hydraulic pressure, that is, the residual wheel cylinder pressure becomes zero. The negative value may be set, for example, in such a manner that the absolute value of the negative value is substantially half of the width of the dead-band region (width of one of the upper portion and the lower portion of the dead-band region with respect to the target value: hereinafter, referred to as "dead-band width"). Alternatively, the negative value may be adjusted to a value that is smaller than the dead-band width based on the period in which the target value is set to the negative value. As described above, the actual hydraulic pressure is brought to zero at time t4, as shown in FIG. 4, by temporarily setting the target hydraulic pressure to the residual pressure reduction target value that is a negative value. That is, the residual wheel cylinder pressure is reduced. As a result, it is possible to suppress occurrence of brake drag.

In the first embodiment of the invention, the condition that the deviation of the actual torque used as the actual regenerative braking force from the required regeneration torque used as the required regenerative braking force is within a predetermined permissible deviation range is set as the condition for executing the residual pressure reduction control. That is, the minimum unit of the braking torque that is calculated when the regenerative braking control is executed by the hybrid ECU 7 does not accurately match the minimum unit of the braking torque that is calculated when the hydraulic braking control is executed by the brake ECU 70. Usually, calculation is performed using a coarser unit in the regenerative braking control, which is supplementarily executed than in the hydraulic braking control. For example, the braking torque is calculated in 1 N unit in the hydraulic braking control, whereas the braking torque is calculated in 2 to 4 N unit in the regenerative braking control. Therefore, it is basically determined that the required braking force is achieved by executing only the regenerative braking control if the deviation of the actual torque from the braking torque in the regenerative braking control is equal to or smaller than the minimum unit used in the regenerative braking control. Based on the minimum unit of the braking torque that is used in the hydraulic braking control (hereinafter, referred to as "torque LSB"), torque LSB ×β is set as the permissible deviation that is determined with the coarseness of the unit used in the regenerative braking control taken into account. In the first embodiment of the invention, an adjustment coefficient β is set to 2 to 4 with consideration given to the fluctuation in the hydraulic pressure in the main passage 45 and the microscopic fluctuation in the operation amount of the brake pedal 24. If the deviation of the actual torque from the required regeneration torque is equal to or smaller than the permissible deviation, it is determined that the target hydraulic pressure used in the hydraulic braking control is zero and execution of the residual pressure reduction control is permitted. On the other hand, if the deviation of the actual torque from the required regeneration torque exceeds the permissible deviation, it is determined that sufficient braking torque is not achieved by executing only the regenerative braking control. Then, execution of the residual pressure reduction control is prohibited in order to compensate for the shortfall by executing the hydraulic braking control.

Figure 5:
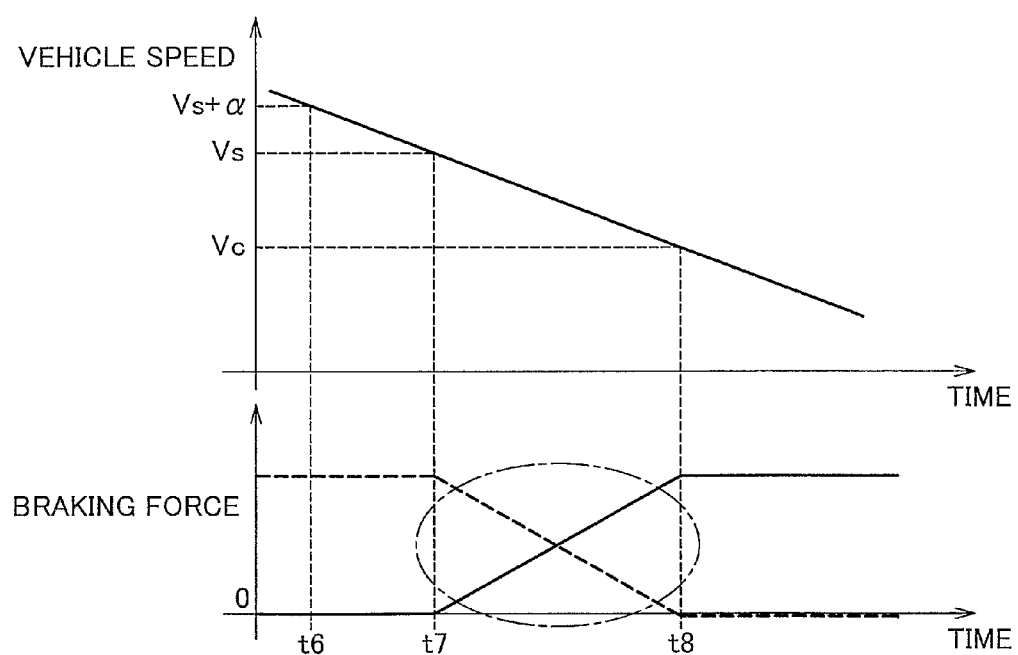
FIG. 5 is a graph showing the state when the braking control is switched from the regenerative braking control to the hydraulic braking control in the cooperative braking control.

FIG. 5 is a graph showing the state when the braking control is switched from the regenerative braking control to the hydraulic braking control in the cooperative braking control. The upper portion of FIG. 5 shows a change in the vehicle speed during the cooperative braking control. The lower portion of FIG. 5 shows changes in the required regenerative braking force (indicated by a dotted line) and the required hydraulic braking force (indicated by a solid line). The abscissa axis in FIG. 5 represents the elapsed time.

That is, in principle, the regenerative braking force is generated only when the vehicle is in motion, and the regenerative braking force is zero when the vehicle is at a standstill. Therefore, when the vehicle is brought to a standstill during the cooperative braking control, the control mode is switched from the control mode in which the required braking force is achieved using the regenerative braking force and the hydraulic braking force to the control mode in which the required braking force is generated using only the hydraulic braking force. During the transition from the control mode, the hydraulic braking force is increased. When the vehicle is brought to a standstill, "changeover control" for switching the braking force from the regenerative braking force to the hydraulic braking force is executed.

In the "changeover control", the hydraulic braking force is increased toward the required braking force and the regenerative braking force is decreased, while the sum of the regenerative braking force and the hydraulic braking force is kept equal to the required braking force. In this case, the control unit starts the changeover control when the vehicle speed is decreased to a predetermined vehicle speed (hereinafter, this predetermined vehicle speed will be referred to as "changeover vehicle speed"). As the vehicle speed decreases after it falls below the changeover vehicle speed, the control unit gradually increases the required hydraulic braking force toward the required braking force while gradually decreasing the required regenerative braking force toward zero. The control unit sets the required regenerative braking force and the required hydraulic braking force so that the sum of these braking forces matches the required braking force. The control unit controls the regenerative brake unit 10 and the hydraulic brake unit 20 so that the actual regenerative braking force and the actual hydraulic braking force match the required regenerative braking force and the required hydraulic braking force, respectively. That is, the control unit increases the hydraulic braking force and decreases the regenerative braking force in such a manner that the sum of the regenerative braking force and the hydraulic braking force matches the required braking force.

In an example shown in FIG. 5, when the vehicle is brought to a standstill, a changeover vehicle speed Vs (14 km/h in the first embodiment of the invention) is achieved and the changeover control is started at time t7. Thus, the required regenerative braking force is gradually decreased and the required hydraulic braking force is gradually increased. The changeover control is set to end when the vehicle speed matches a changeover end vehicle speed Vc (7 km/h in the first embodiment of the invention). In the example shown in FIG. 5, a changeover region in which the changeover control is executed is indicated by a chain line. The changeover control ends at time t8.

As described above, when the changeover control is executed, the hydraulic braking force needs to be increased, and the response of the hydraulic pressure to the hydraulic pressure increasing control needs to be high. Therefore, the residual pressure reduction control is not executed during the changeover control. In the first embodiment of the invention, slightly before the changeover control is started, that is, at time t6 at which the vehicle speed falls below a residual pressure reduction prohibition vehicle speed (Vs+α) that is slightly higher than the changeover vehicle speed Vs during deceleration, the residual pressure reduction control is prohibited. Therefore, the target hydraulic pressure is not increased in this case.

Figure 6A:
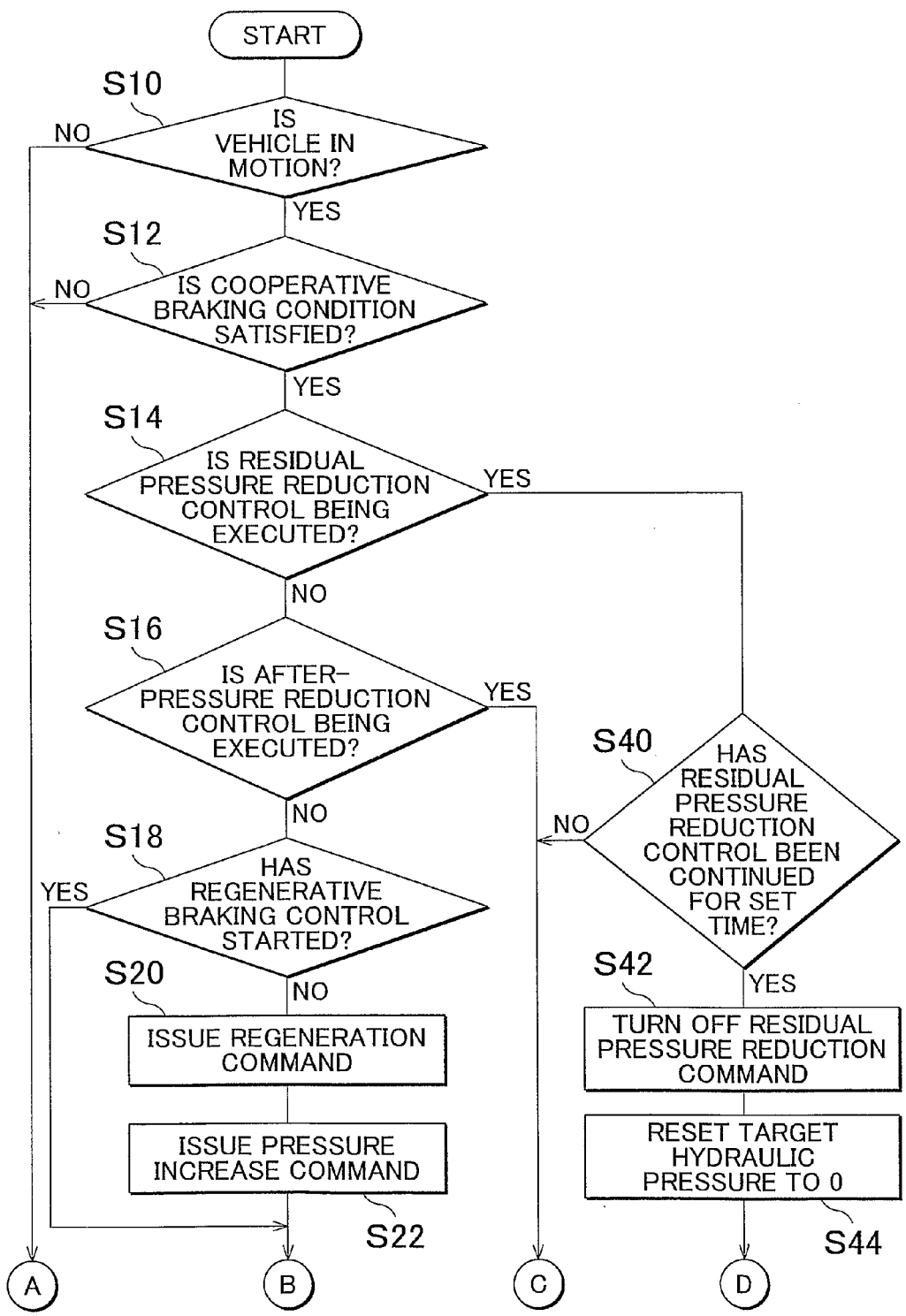
FIG. 6 is a flowchart showing a main portion of a cooperative braking control routine.
Figure 6B:
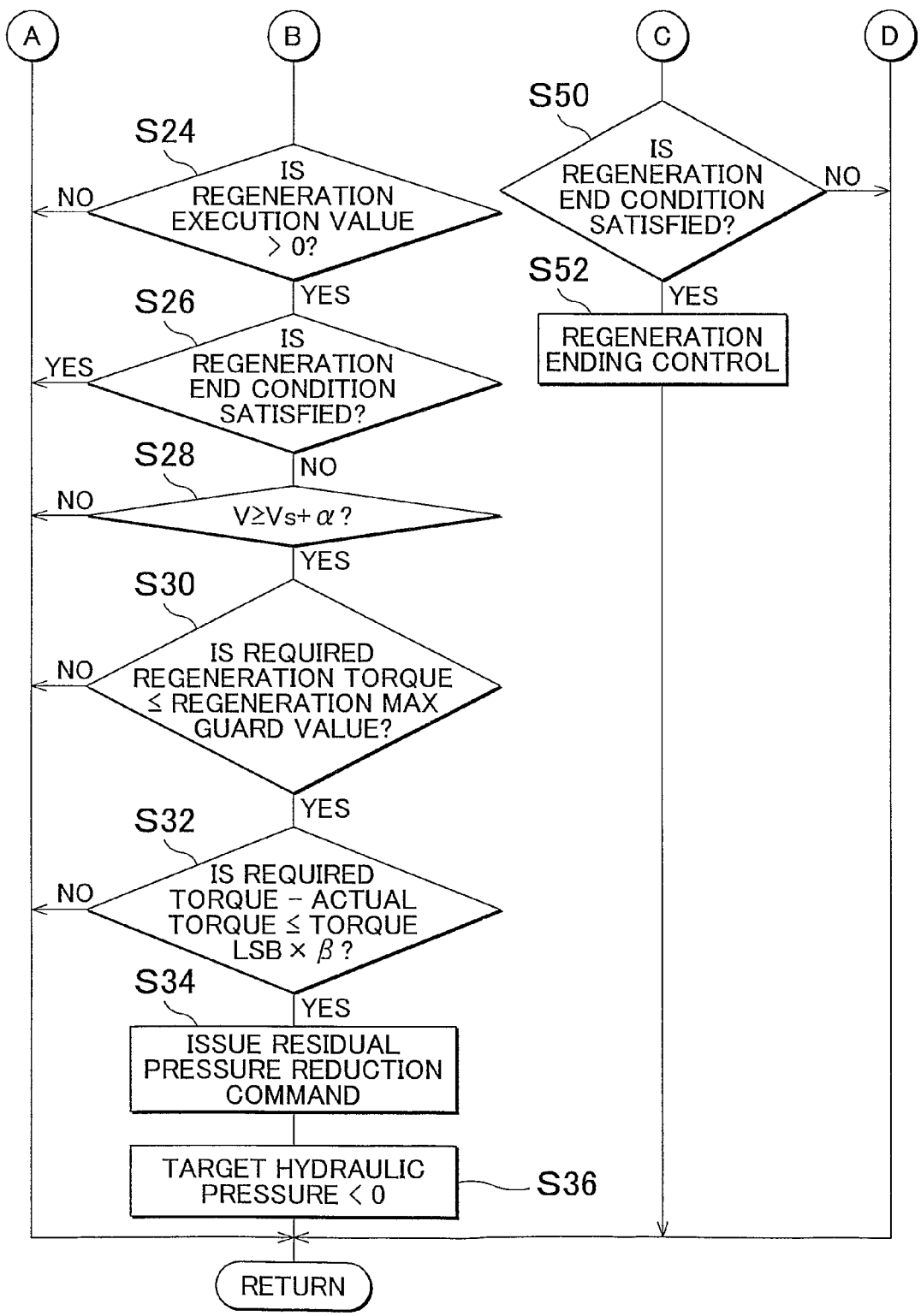

FIG. 6 is a flowchart showing a main portion of the cooperative braking control routine. The control routine is periodically executed after an ignition switch (not shown) is turned on.

The brake ECU 70 determines whether the vehicle 1 is in motion based on the information detected by the vehicle speed sensor 75. If it is determined that the vehicle 1 is in motion ("YES" in S10), the brake ECU 70 determines whether a predetermined condition for starting the cooperative braking control (hereinafter, referred to as "cooperative braking condition") is satisfied. If it is determined that the cooperative braking condition is satisfied ("YES" in S12), it is determined that the residual pressure reduction control is not executed ("NO" in S14), it is determined that the after-pressure reduction control is not executed ("NO" in S16), and it is determined that the regenerative braking control has not started yet ("NO" in S18), the brake ECU 70 determines the required regenerative braking force as described above. Then, the brake ECU 70 transmits a signal indicating the required regeneration torque as a required regeneration value to the hybrid ECU 7 (S20), and transmits a control signal, as a command to increase the hydraulic pressure, to the pressure-increasing linear control valve 66 (S22). If it is determined that S20 and S22 has been executed and the regenerative braking control has already been started ("YES" in S18), S20 and S22 are skipped. Then, as shown in FIG. 3, the wheel cylinder pressure is temporarily increased. If it is determined that the vehicle 1 is not in motion ("NO" in S10), or if it is determined that the cooperative braking condition is not satisfied ("NO" in S12), the control routine ends.

If brake ECU 70 determines that the regeneration execution value becomes larger than zero based on the information concerning the actual regenerative braking force received from the hybrid ECU 7 ("YES" in S24) and makes a negative determination in the regeneration end determination ("NO" in S26), the brake ECU 70 determines whether the vehicle speed is equal to or higher than the residual pressure reduction prohibition vehicle speed (VS+α). The "regeneration end determination" is a determination as to whether the ending condition for the cooperative braking control itself has been satisfied. That is, an affirmative determination is made in the regeneration end determination, when the cooperative braking control is no longer necessary, for example, when the driver issues an acceleration command by depressing an accelerator pedal (not shown) instead of the brake pedal 24.

If it is determined that the vehicle speed is equal to or higher than the residual pressure reduction prohibition vehicle speed (Vs+α) ("YES" in S28), it is determined whether execution of the residual pressure reduction prohibition control is permitted. That is, when the required regeneration torque is equal to or lower than the regeneration MAX guard value ("YES" in S30) and the deviation of the actual torque from the required regeneration torque is equal to or smaller than the permissible deviation (torque LSB+β), ("YES" in S32), the brake ECU 70 turns on a residual pressure reduction command flag that indicates issuance of a command to reduce the residual pressure (S34), and sets the target hydraulic pressure to a residual pressure reduction target value that is smaller than zero (S36).

On the other hand, if it is determined in S24 that the regeneration execution value is equal to or smaller than zero ("NO" in S24), if it is determined in S26 that an affirmative determination is made in the regeneration end determination ("YES" in S26), or if it is determined in S28 that the vehicle speed is lower than the residual pressure reduction prohibition vehicle speed (Vs+α) ("NO" in S28), the control routine ends. If it is determined in S30 that the required torque is higher than the regeneration MAX guard value ("NO" in S30) or if it is determined in S32 that the deviation is larger than the permissible deviation ("NO" in S32), the control routine ends.

If it is determined in S14 that the residual pressure reduction control is being executed ("YES" in S14), the brake ECU 70 determines whether the residual pressure reduction control has been continued for a predetermined set time (S40). The "set time" is empirically determined in advance as the time that is long enough to reliably bring the residual pressure to zero if the residual pressure reduction control is executed. If it is determined in S40 that the residual pressure reduction control has been continued for the set time ("YES" in S40), the brake ECU 70 turns off the residual pressure reduction command flag (S42), and resets the target hydraulic pressure to zero (S44). Thus, unnecessary pressure reduction is avoided, and the hydraulic pressure responds to the control sufficiently quickly when the hydraulic braking control is resumed. In the first embodiment of the invention, the normal regenerative braking control that is continued after the target hydraulic pressure is reset to zero will be referred to as "after-pressure reduction control".

On the other hand, if it is determined in S40 that the residual pressure reduction control has not been continued for the set time ("NO" in S40), that is, if it is determined that the residual pressure reduction control is being executed, and if an affirmative determination is made in the regeneration end determination as in S26 ("YES" in S50), the brake ECU 70 executes a predetermined regeneration ending control for ending the regenerative braking control (S52). The brake ECU 70 transmits a command signal for ending the regenerative braking control to the hybrid ECU 7. If it is determined in S16 that the after-pressure reduction control is being executed and an affirmative determination is made in the regeneration end determination ("YES" in S16 and "YES" in S50), the regeneration ending control is executed (S52). If a negative determination is made in the regeneration end determination ("NO" in S50), the routine ends.

As described above, in the first embodiment of the invention, when the residual pressure reduction condition is satisfied during the cooperative braking control, the residual pressure reduction control is executed to set the target hydraulic pressure to a value that is lower than zero which is set as the original target hydraulic pressure. As a result, it is possible to reliably bring the actual hydraulic pressure in the wheel cylinder 23 to zero even when the dead-band region is set, and to suppress occurrence of brake drag.

Second Embodiment of the Invention

Next, a second embodiment of the invention will be described. The second embodiment is mostly the same as the first embodiment except that the residual pressure reduction control is executed in controls other than the cooperative braking control. Therefore, the same reference numerals will be assigned to the components that are substantially the same as those in the first embodiment of the invention, and descriptions concerning these components will not be provided below.

Figure 7:
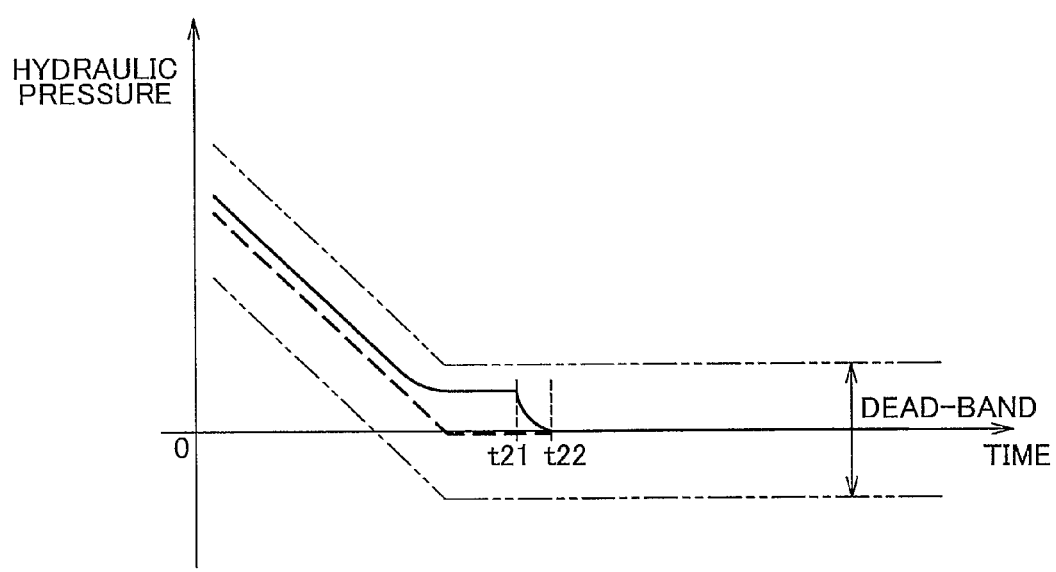
FIG. 7 is a graph showing a main portion of a brake control method according to a second embodiment of the invention.

FIG. 7 is a graph showing a main portion of a brake control method according to the second embodiment of the invention. FIG. 7 shows the state when the hydraulic pressure is decreased in the hydraulic braking control. FIG. 7 shows the target hydraulic pressure (indicated by a dashed line) and the actual hydraulic pressure (indicated by a solid line) of the hydraulic fluid in the hydraulic braking control. The region between the chain double-dashed lines is the dead-band region. The abscissa axis in FIG. 7 represents the elapsed time.

According to the second embodiment of the invention, when the actual hydraulic pressure enters the dead-band region that is used when the target hydraulic pressure is zero, the residual pressure reduction control is executed. In the residual pressure reduction control, the pressure-decreasing linear control valve 67 is fully opened, and the residual pressure as the wheel cylinder pressure is forcibly brought to zero. In an example shown in FIG. 7, after the actual hydraulic pressure enters the dead-band region because the target hydraulic pressure is set to zero, the pressure-decreasing linear control valve 67 is opened at time t21 and kept open for a predetermined time. Thus, the actual hydraulic pressure matches zero at time t22. As a result, it is possible to suppress occurrence of brake drag.

In the second embodiment of the invention, on condition that the vehicle 1 is at a standstill on a level ground, the residual pressure reduction control is executed even when the vehicle is at a standstill. A shift position sensor that detects the current shift range, a parking brake switch that detects an operation of a parking brake, and an inclination sensor that detects the inclination of the vehicle 1 in the longitudinal direction thereof are connected to the brake ECU 70 according to the second embodiment of the invention. The brake ECU 70 executes the residual pressure reduction control when these sensors (state detection unit) determines that the shift range is Park, the parking brake is applied, and the inclination of the vehicle 1 is within a permissible inclination range. The "permissible inclination range" is set to an inclination range in which the vehicle does not move due to its weight even if the wheel cylinder pressure is zero. This permissible inclination range is empirically determined in advance. When the vehicle 1 is at a standstill on a slope, the residual pressure is not reduced because priority is given to the safety.

Figure 8:
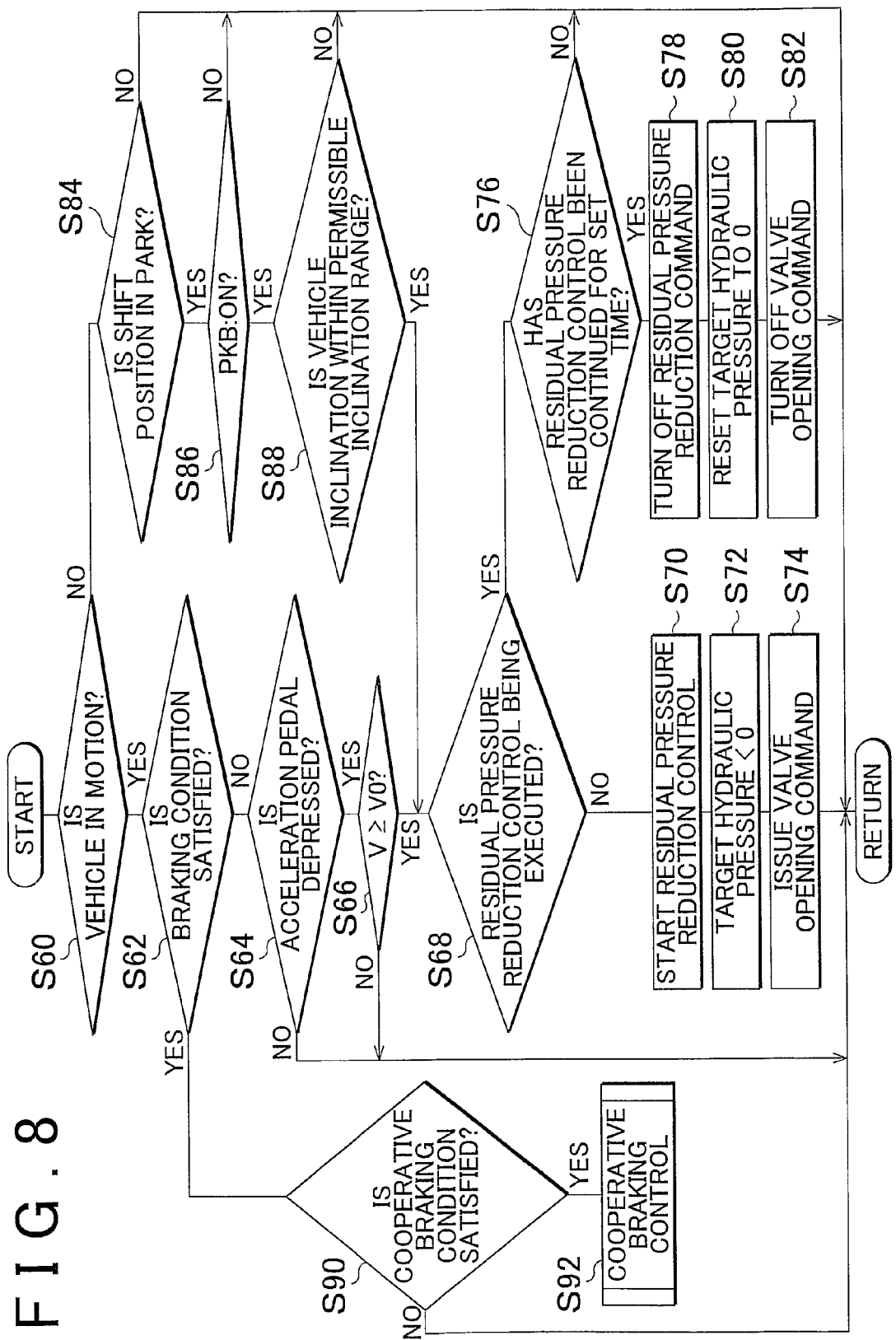
FIG. 8 is a flowchart showing a brake control routine.

FIG. 8 is a flowchart showing a brake control routine. The brake control routine is periodically executed after an ignition switch (not shown) is turned on.

First, the brake ECU 70 determines whether the vehicle 1 is in motion based on the information detected by the vehicle speed sensor 75. If it is determined that the vehicle 1 is in motion ("YES" in S60), the brake ECU 70 determines whether a braking condition for executing the brake control is satisfied based on the information detected by, for example, the stroke sensor 25. Because a condition that is commonly used to execute the brake control is set as the "braking condition", detailed description thereof will not be provided below. If it is determined that the braking condition is not satisfied ("NO" in S62), the brake ECU 70 determines whether the accelerator pedal is depressed based on the information detected by an accelerator pedal operation amount sensor (corresponding to "state detection unit"). If it is determined that the accelerator pedal is depressed ("YES" in S64), the brake ECU 70 determines whether the vehicle speed is equal to or higher than a reduction determination vehicle speed V0. The "reduction determination vehicle speed" is set in advance as the reference for determining whether the residual pressure reduction control while the vehicle is in motion is permitted. At the reduction determination vehicle speed, the accelerator pedal is reliably depressed.

If it is determined that the vehicle speed is equal to or higher than the reduction determination vehicle speed V0 ("YES" in S66) and it is determined that the residual pressure reduction control is not being executed ("NO" in S68), the brake ECU 70 turns on the residual pressure reduction flag (S70) and sets the target hydraulic pressure to a residual pressure reduction target value that is smaller than zero (S72). Further, the brake ECU 70 fully opens the pressure-decreasing linear control valve 67 (S74). If it is determined in S64 that the accelerator pedal is not depressed ("NO" in S64), or if it is determined that the vehicle speed is lower than the reduction determination vehicle speed V0 ("NO" in S66), the control routine ends.

If it is determined in S68 that the residual pressure reduction control is being executed ("YES" in S68), the brake ECU 70 determines whether the residual pressure reduction control has been continued for a predetermined set time (S76). The set time is set to a time that is required to reliably bring the residual pressure to zero when the residual pressure reduction control is executed. The "set time" is empirically determined in advance as the time that is long enough to reliably bring the residual pressure to zero if the residual pressure reduction control is executed. In the residual pressure reduction control, control for fully opening the pressure-decreasing linear control valve 67 is executed in addition to the control for setting the target hydraulic pressure to a negative value, which is described in the first embodiment of the invention. Therefore, the set time may be set in a manner different from that in the first embodiment of the invention. For example, the set time may be set to a time shorter than that in the first embodiment of the invention.

If it is determined in S76 that the residual pressure reduction control has been continued for the predetermined set time ("YES" in S76), the brake ECU 70 turns off the residual pressure reduction flag (S78) and resets the target hydraulic pressure to zero (S80). Then, the brake ECU 70 places the pressure-decreasing linear control valve 67 into the original control mode that is used when the residual pressure is not reduced (S82). Thus, unnecessary pressure reduction is avoided, and the hydraulic pressure responds to the control sufficiently quickly when the hydraulic braking control is resumed. If it is determined in S76 that the residual pressure reduction control has not been continued for the predetermined set time ("NO" in S76), the control routine ends.

If it is determined in S60 that the vehicle 1 is at a standstill ("NO" in S60), the brake ECU 70 determines whether the vehicle 1 is at a standstill on a level ground. That is, the brake ECU 70 obtains the information detected by the shift position sensor, the parking brake switch and the inclination sensor. If it is determined that the shift position is Park ("YES" in S84), it is determined that the parking switch is on ("YES" in S86), and it is determined that the inclination of the vehicle 1 is within a permissible inclination range ("YES" in S88), the brake ECU 70 determines that the vehicle 1 is at a standstill on a level ground, and executes the residual pressure reduction control in S68. Because S68 to S82 have already been described above, the description thereof will not be provided below. If a negative determination is made in any one of S84, S86 and S88 ("NO" in any one of S84, S86 and S88), the control routine ends.

If it is determined in S62 that the braking condition is satisfied ("YES" in S62), the brake ECU 70 executes the cooperating braking control (92) if the predetermined control condition for the cooperative braking control is satisfied ("YES" in S90). As the cooperative braking control, for example, the control routine in FIG. 6, which is described in the first embodiment of the invention, may be executed. On the other hand, if it is determined in S90 that the control condition for the cooperative braking control is not satisfied ("NO" in 90), the control routine ends.

According to the second embodiment of the invention, the residual pressure reduction control is executed also when an acceleration determination condition under which the vehicle 1 is estimated to accelerate is satisfied. Thus, the response to the acceleration control that will be subsequently executed is enhanced, and the operation feel that is achieved by the acceleration feel is enhanced.

The embodiments of the invention that have been described in the specification are to be considered in all respects as illustrative and not restrictive. Various modifications such as various design changes may be made to the embodiments of the invention based on the knowledge of those who are skilled in the art. The embodiments of the invention to which such modifications are made may be within the scope of the invention.

Figure 9:
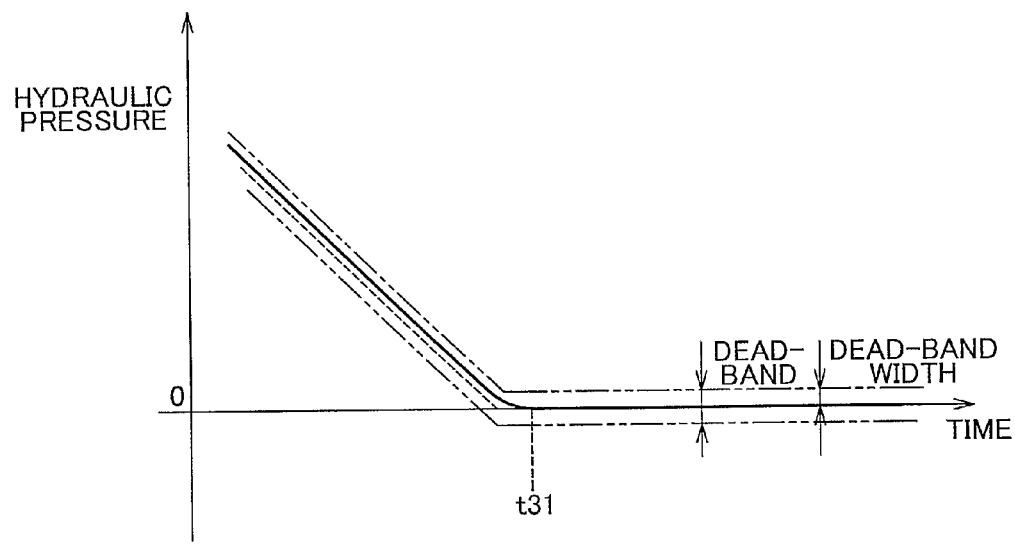
FIG. 9 is a graph showing a main portion of a cooperative braking control according to a modification of the embodiment of the invention.

Each embodiment of the invention shows the example in which the dead-band region is maintained as it is and the target hydraulic pressure is set to a value lower than zero in the residual pressure reduction control, whereby the actual hydraulic pressure is brought closer to zero. In a modification, the dead-band region itself may be reduced in the residual pressure reduction control. FIG. 9 is a graph showing a main portion of the cooperative braking control according to the modification. FIG. 9 shows the state when the braking control is switched from the hydraulic braking control to the regenerative braking control in the cooperative braking control. FIG. 8 corresponds to FIG. 4. FIG. 9 shows the target hydraulic pressure (indicated by a dashed line) and the actual hydraulic pressure (indicated by a solid line) of the hydraulic fluid in the hydraulic braking control, and the region between the chain double-dashed lines is the dead-band region. The abscissa axis in FIG. 9 represents the elapsed time.

In comparison with FIG. 4, in the modification, the dead-band width when the braking control is switched from the hydraulic braking control to the regenerative braking control is narrow. As a result, the actual hydraulic pressure changes in a manner that is substantially the same as the manner in which the target hydraulic pressure changes. The actual hydraulic pressure is zero at time t31. In this case, hunting may occur in the actual hydraulic pressure, because the dead-band region is narrow. However, priority is given to enhancement of the response at which the actual hydraulic pressure is brought to zero. The dead-band width may be returned to the original width after a predetermined time has elapsed since the residual pressure reduction control is started and the actual hydraulic pressure is zero. The modification may be applied not only to the cooperative braking control but also to the residual pressure reduction control that is executed in control other than the regenerative braking control shown in FIG. 7.

Although not described in the embodiments of the invention described above, the residual pressure reduction control may be executed every time the target hydraulic pressure should be brought to zero. The residual pressure reduction control may be executed when the vehicle is in motion or every time the brake pedal is released. The residual pressure reduction control may be executed every time Park is selected as the shift range, or every time the parking brake switch is turned on. Thus, the residual pressure in the wheel cylinder is eliminated, whereby the response when the vehicle is started or accelerated is enhanced.

Figure 10:
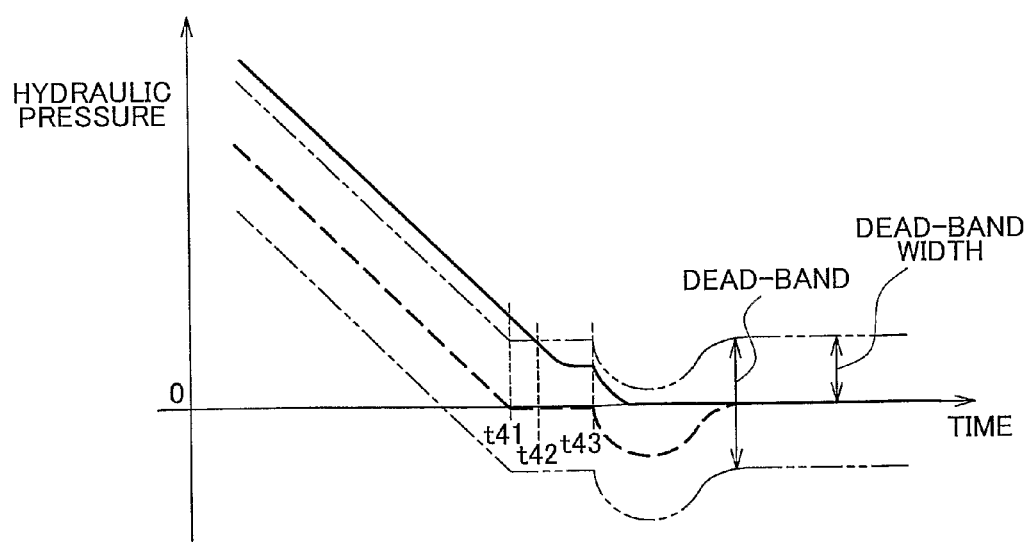
FIG. 10 is a graph showing a main portion of a cooperative braking control according to another modification of the embodiment of the invention.

Although not described in the first embodiment of the invention, a predetermined period in which the target hydraulic pressure is zero may be set before the residual pressure reduction control is started in consideration of, for example, delay in response of the actual hydraulic pressure to the control for achieving the target hydraulic pressure. FIG. 10 is a graph showing a main portion of the cooperative braking control according to a modification. FIG. 10 shows the state when the pressure is decreased while the braking control is switched from the hydraulic braking control to the regenerative control in the cooperative braking control. FIG. 10 corresponds to FIG. 4. FIG. 10 shows the target hydraulic pressure (indicated by a dashed line) and the actual hydraulic pressure (indicated by a solid line) of the hydraulic fluid in the hydraulic braking control, and the region between the chain double-dashed lines is the dead-band region. The abscissa axis in FIG. 10 represents the elapsed time.

In FIG. 10, the target hydraulic pressure is set to zero at time t41, and maintained during a predetermined set period. It is determined whether the residual pressure reduction condition is satisfied within the set period. In an example shown in FIG. 10, the actual hydraulic pressure enters the dead-band region at time t42. Because the residual pressure reduction condition is satisfied, the residual pressure reduction control using a negative value (<0) as the target hydraulic pressure is executed from time t43. A method in which it is determined whether the residual pressure reduction condition is satisfied within the set period in which the target hydraulic pressure is zero may be applied to another residual pressure reduction control. When the residual pressure reduction control is satisfied within the set period in which the target hydraulic pressure is zero in the residual pressure reduction control shown in FIG. 9, the dead-band width may be reduced. Alternatively, when the residual pressure reduction condition is satisfied within the set period in which the target hydraulic pressure is zero in the residual pressure reduction control other than the regenerative braking control shown in FIG. 7, the pressure-decreasing linear control valve 67 may be fully open during a predetermined period.

The invention claimed is:

1. A brake apparatus comprising:
a regenerative brake unit that generates a regenerative braking force by executing regenerative control over an electric motor;
a hydraulic brake unit that generates a hydraulic braking force by executing hydraulic control over a hydraulic fluid; and
a control unit that controls the regenerative brake unit and the hydraulic brake unit in such a manner that a required braking force, which is calculated based on a brake operation performed by a driver, is achieved,
wherein the control unit sets a dead-band region for a target hydraulic pressure that is used in the hydraulic control, and controls a hydraulic pressure of the hydraulic fluid using the dead-band region, and
wherein when a predetermined residual pressure reduction condition for adjusting an actual hydraulic pressure to the target hydraulic pressure is satisfied while the hydraulic pressure is decreased, the control unit executes residual pressure reduction control in which the target hydraulic pressure is set to a temporary value that is lower than an actual target value to which the hydraulic pressure needs to be adjusted, and the control unit maintains the set target hydraulic pressure at the temporary value during a predetermined period, wherein the temporary value, to which the control unit sets the target hydraulic pressure, is lower than the actual target value by an amount corresponding to a dead-band width of the dead-band region in the residual pressure reduction control such that the dead-band region shifts.

2. The brake apparatus according to claim 1, wherein the residual pressure reduction condition includes a condition that the regenerative control is being executed.

3. The brake apparatus according to claim 2, wherein the control unit prohibits execution of the residual pressure reduction control unless the regenerative control is being executed.

4. The brake apparatus according to claim 2, further comprising:
a state detection unit that detects a control state of a vehicle,
wherein the control unit determines whether there is a possibility that the hydraulic pressure is increased in the hydraulic control based on information detected by the state detection unit, and
when a predetermined pressure-increase determination condition, under which there is a possibility that the hydraulic pressure is increased, is satisfied, the control unit restricts execution of the residual pressure reduction control.

5. The brake apparatus according to claim 4, wherein:
the state detection unit includes a vehicle speed detection unit that detects a vehicle speed;
the control unit sets a changeover vehicle speed at which changeover control for changing braking control from the regenerative control to the hydraulic control is started;
the control unit sets, in advance, a residual pressure reduction prohibition vehicle speed, at which execution of the residual pressure reduction control is prohibited and which is equal to or higher than the changeover vehicle speed, to prevent a decrease in the hydraulic pressure during the changeover control; and
the control unit determines that the pressure-increase determination condition is satisfied when the vehicle speed that is detected by the vehicle speed detection unit falls below the residual pressure reduction prohibition vehicle speed.

6. The brake apparatus according to claim 2, wherein the control unit restricts execution of the residual pressure reduction control when a deviation of an actual torque that is actually achieved from a required regeneration torque, which is a target value used in the regenerative control, is larger than a predetermined permissible deviation.

7. The brake apparatus according to claim 1, further comprising:
a state detection unit that detects a control state of a vehicle,
wherein the control unit determines whether there is a possibility that the vehicle is accelerated based on information detected by the state detection unit, and
when a predetermined acceleration determination condition, under which there is a possibility that the vehicle is accelerated, is satisfied, the control unit executes the residual pressure reduction control.

8. The brake apparatus according to claim 1, wherein the control unit executes the residual pressure reduction control when a hydraulic pressure that needs to be achieved is zero, regardless of whether the residual pressure reduction condition is satisfied.

9. A brake apparatus comprising:
a regenerative brake unit that generates a regenerative braking force by executing regenerative control over an electric motor;
a hydraulic brake unit that generates a hydraulic braking force by executing hydraulic control over a hydraulic fluid; and
a control unit that controls the regenerative brake unit and the hydraulic brake unit in such a manner that a required braking force, which is calculated based on a brake operation performed by a driver, is achieved,
wherein the control unit sets a dead-band region for a target hydraulic pressure that is used in the hydraulic control, and controls a hydraulic pressure of the hydraulic fluid using the dead-band region, and
when a predetermined residual pressure reduction condition for adjusting an actual hydraulic pressure to the target hydraulic pressure is satisfied while the hydraulic pressure is decreased, the control unit sets a dead-band width of the dead-band region that is narrower than a dead-band width of the dead-band region that is used when the residual pressure reduction condition is not satisfied, and maintains the narrower dead-band width during a predetermined period.

10. A brake control unit which is provided in a brake apparatus including a regenerative brake unit that generates a regenerative braking force by executing regenerative control over an electric motor, and a hydraulic brake unit that generates a hydraulic braking force by executing hydraulic control over a hydraulic fluid, the brake control unit comprising:
a controller that controls the regenerative brake unit and the hydraulic brake unit in such a manner that a required braking force, which is calculated based on a brake operation performed by a driver, is achieved,
wherein the controller sets a dead-band region for a target hydraulic pressure that is used in the hydraulic control, and controls a hydraulic pressure of the hydraulic fluid using the dead-band region, and
wherein when a predetermined residual pressure reduction condition for adjusting an actual hydraulic pressure to the target hydraulic pressure is satisfied while the hydraulic pressure is decreased, the control unit executes residual pressure reduction control in which the target hydraulic pressure is set to a temporary value that is lower than an actual target value to which the hydraulic pressure needs to be adjusted, and the control unit maintains the set target hydraulic pressure at the temporary value during a predetermined period,
wherein the temporary value, to which the control unit sets the target hydraulic pressure, is lower than the actual target value by an amount corresponding to a dead-band width of the dead-band region in the residual pressure reduction control such that the dead-band region shifts.

11. A brake control unit which is provided in a brake apparatus including a regenerative brake unit that generates a regenerative braking force by executing regenerative control over an electric motor, and a hydraulic brake unit that generates a hydraulic braking force by executing hydraulic control over a hydraulic fluid, the brake control unit comprising:
a controller that controls the regenerative brake unit and the hydraulic brake unit in such a manner that a required braking force, which is calculated based on a brake operation performed by a driver, is achieved,
wherein the controller sets a dead-band region for a target hydraulic pressure that is used in the hydraulic control, and controls a hydraulic pressure of the hydraulic fluid using the dead-band region, and when a predetermined residual pressure reduction condition for adjusting an actual hydraulic pressure to the target hydraulic pressure is satisfied while the hydraulic pressure is decreased, the controller sets a dead-band width of the dead-band region that is narrower than a dead-band width of the dead-band region that is used when the residual pressure reduction condition is not satisfied, and maintains the narrower dead-band width during a predetermined period.

12. A brake control method including cooperative braking control in which regenerative control that is executed over an electric motor and hydraulic control that is executed over a hydraulic fluid are executed in a coordinated manner, comprising:

calculating a required braking force based on a brake operation performed by a driver;

determining an allocation ratio between a braking force that needs to be generated by the regenerative control and a braking force that needs to be generated by the hydraulic control in order to achieve the required braking force;

executing the control based on the allocation ratio;

setting a dead-band region for a target hydraulic pressure that is used in the hydraulic control and controlling a hydraulic pressure of the hydraulic fluid using the dead-band region when the hydraulic control is executed under normal conditions;

executing residual pressure reduction control in which the target hydraulic pressure is set to a temporary value that is lower than an actual target value to which the hydraulic pressure needs to be adjusted, the set target hydraulic pressure being maintained at the temporary value during a predetermined period, when a predetermined residual pressure reduction condition for adjusting an actual hydraulic pressure to the target hydraulic pressure is satisfied while the hydraulic pressure is decreased during the hydraulic control; and setting the temporary value, to which the target hydraulic pressure is set, to a value that is lower than the actual target value by an amount corresponding to a dead-band width of the dead-band region in the residual pressure reduction control such that the dead-band region shifts.

13. A brake control method including cooperative braking control in which regenerative control that is executed over an electric motor and hydraulic control that is executed over a hydraulic fluid are executed in a coordinated manner, comprising:

calculating a required braking force based on a brake operation performed by a driver;

determining an allocation ratio between a braking force that needs to be generated by the regenerative control and a braking force that needs to be generated by the hydraulic control in order to achieve the required braking force;

executing the control based on the allocation ratio;

setting a dead-band region for a target hydraulic pressure that is used in the hydraulic control and controlling a hydraulic pressure of the hydraulic fluid using the dead-band region when the hydraulic control is executed under normal conditions; and setting a dead-band width of the dead-band region that is narrower than a dead-band width of the dead-band region that is used when the residual pressure reduction condition is not satisfied, and maintaining the narrower dead-band width during a predetermined period, when a predetermined residual pressure reduction condition for adjusting an actual hydraulic pressure to the target hydraulic pressure is satisfied while the hydraulic pressure is decreased during the hydraulic control.

* * * * *